US006249835B1

United States Patent
Isoda

(10) Patent No.: US 6,249,835 B1
(45) Date of Patent: Jun. 19, 2001

(54) SYSTEM FOR CONVERTING PRINT INSTRUCTION INTO IMAGE DATA OR PRINT DATA BASED ON WHETHER A RASTERIZATION LEVEL IS OF A FIRST LEVEL OR A SECOND LEVEL

(75) Inventor: Takashi Isoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/044,019

(22) Filed: Mar. 19, 1998

(30) Foreign Application Priority Data

Mar. 21, 1997 (JP) .................................................. 9-068159

(51) Int. Cl.[7] ........................................................ G06F 18/14

(52) U.S. Cl. ............................ 710/201; 710/126; 705/24; 707/530

(58) Field of Search ............................ 710/1, 201, 208, 710/126; 709/201, 208, 126; 705/24; 707/530

(56) References Cited

U.S. PATENT DOCUMENTS

| 4,701,841 | * | 10/1987 | Goodrich et al. | 710/126 |
|---|---|---|---|---|
| 5,081,579 | * | 1/1992 | Komai et al. | 705/24 |
| 5,179,692 | * | 1/1993 | Inoue | 710/71 |
| 5,475,686 | * | 12/1995 | Bach et al. | 370/465 |
| 5,524,184 | * | 6/1996 | Johnson | 395/114 |
| 5,659,770 | * | 8/1997 | Yamada | 707/530 |
| 5,671,440 | * | 9/1997 | Curry | 395/828 |
| 5,845,144 | * | 12/1998 | Tateyama et al. | 712/1 |
| 5,966,451 | * | 10/1999 | Utsumi | 380/49 |

* cited by examiner

Primary Examiner—Thomas Lee
Assistant Examiner—Abdelmenien Elamin
(74) Attorney, Agent, or Firm—Fitzpatrick, Cella, Harper & Scinto

(57) ABSTRACT

In order to improve the total print operation speed of a print system for printing data supplied from a host computer via a communications unit, with a printer, a rasterization level is determined in accordance with a data transmission capacity of the communications unit, print data is generated at the determined rasterization level, and the generated data is transmitted to the printer.

28 Claims, 32 Drawing Sheets

FIG. 7

| PRINTER NAME | LINE TYPE |
|---|---|
| PRINTER A | USB |
| PRINTER B | IEEE 1394 |
| PRINTER C | CENTRONICS (ECP) |
| PRINTER D | IEEE 1394 |
| PRINTER E | IrDA |
| PRINTER F | USB |
| PRINTER G | NETWORK |

FIG. 8

|  | USB | CENTRONICS (ECP) | IEEE 1394 ASYNCHR | IEEE 1394 ISOCHR | NETWORK | IrDA |
|---|---|---|---|---|---|---|
| PRINTER A | 3 | 2 | 3 | 3 | 1 | 2 |
| PRINTER B | 3 | 2 | 3 | 3 | 1 | 2 |
| PRINTER C | 2 | 2 | 3 | 3 | 1 | 1 |
| PRINTER D | 2 | 1 | 3 | 3 | 1 | 1 |
| PRINTER E | 2 | 1 | 2 | 3 | 1 | 1 |
| PRINTER F | 1 | 1 | 2 | 3 | 1 | 1 |
| PRINTER G | 1 | 1 | 2 | 3 | 1 | 1 |

FIG. 10
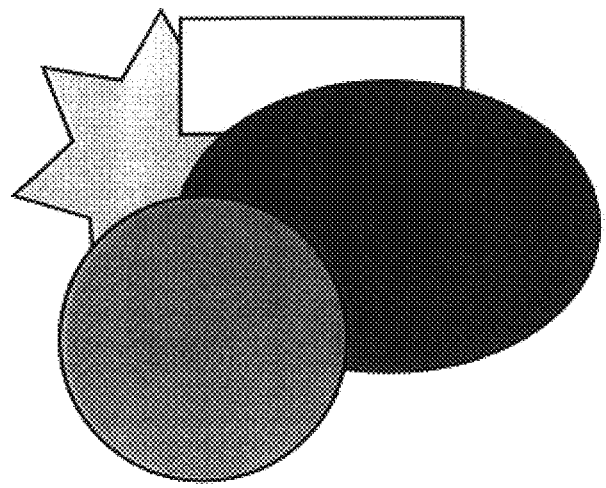
FIG. 11
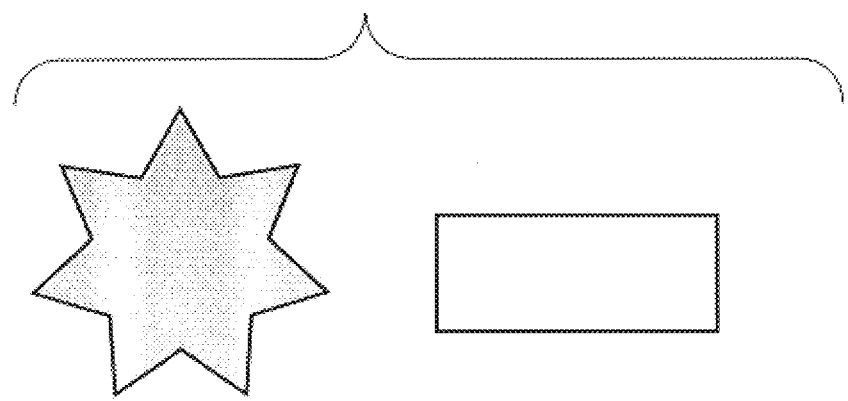
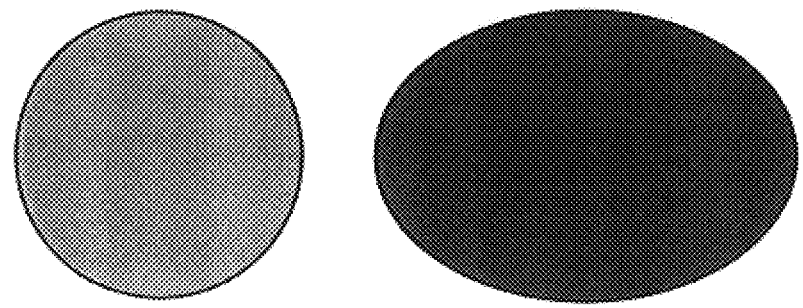

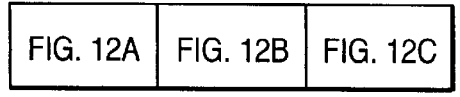
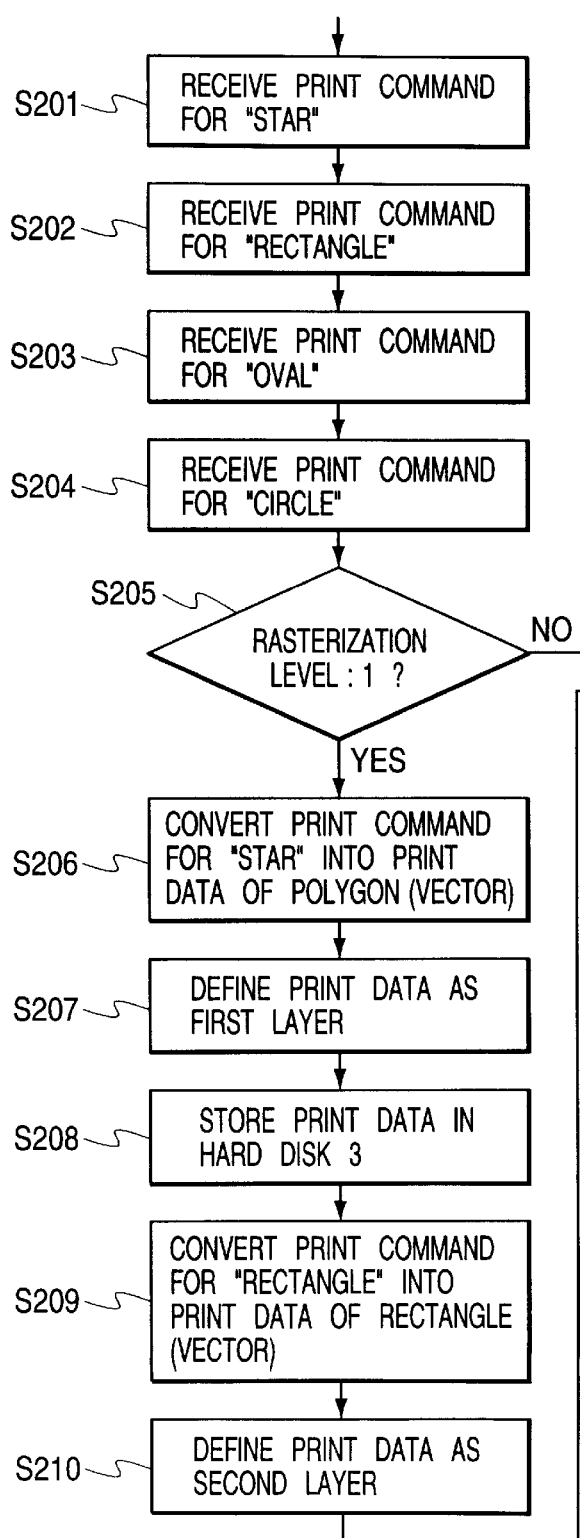
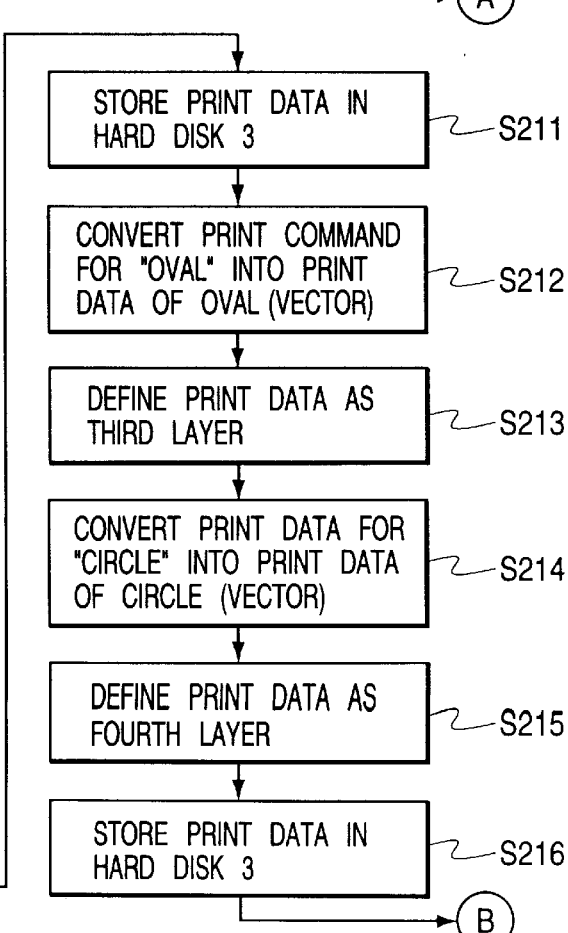

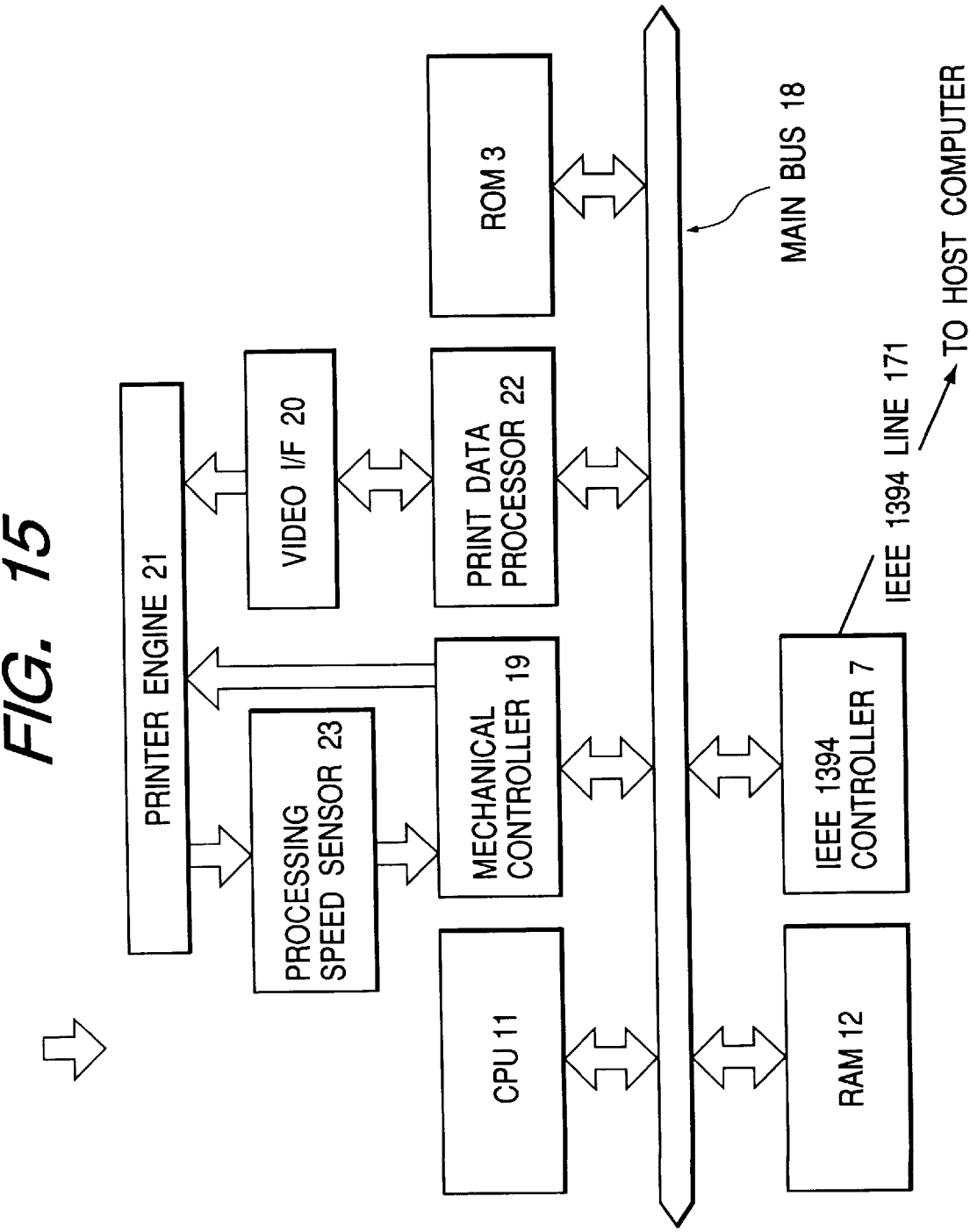

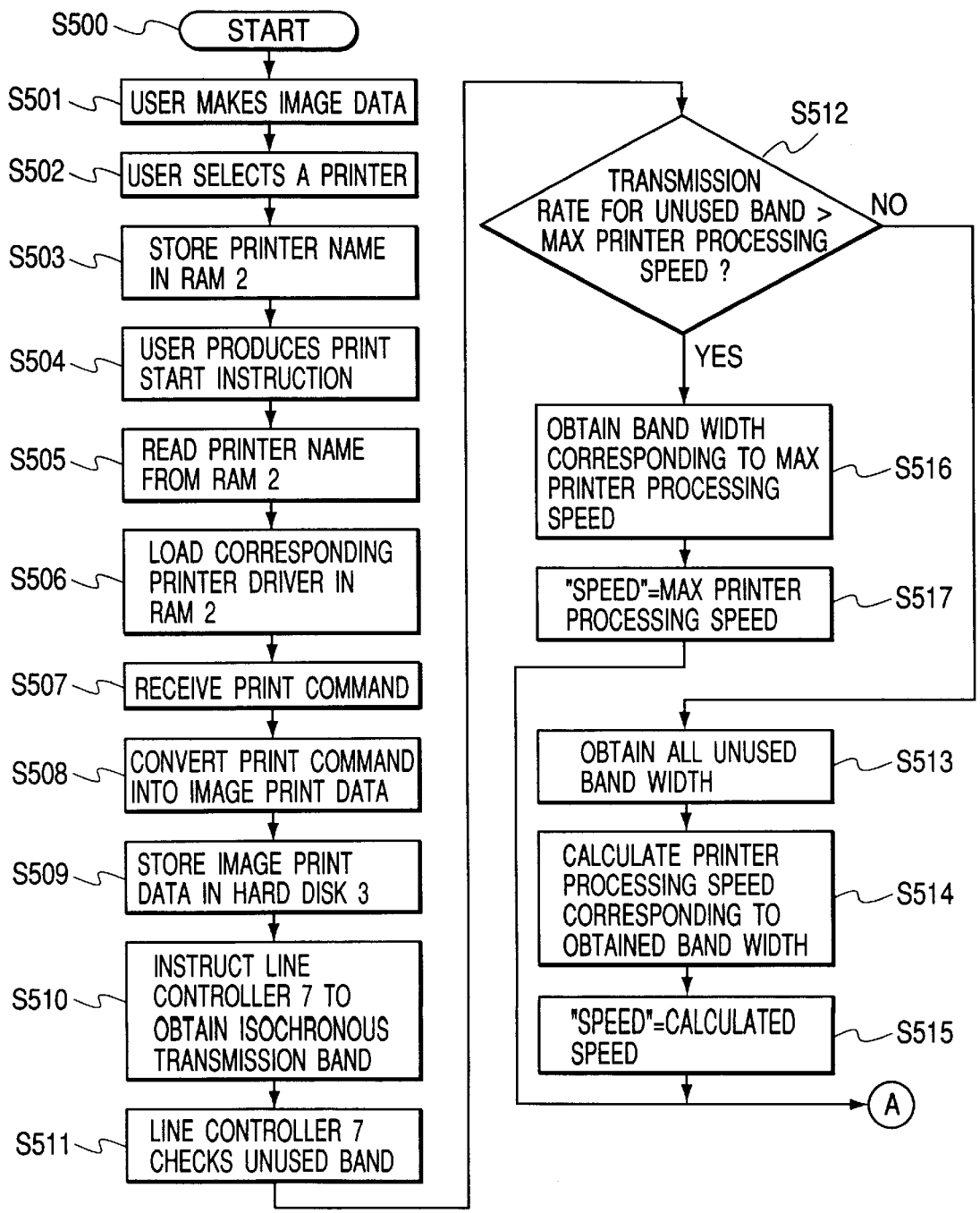

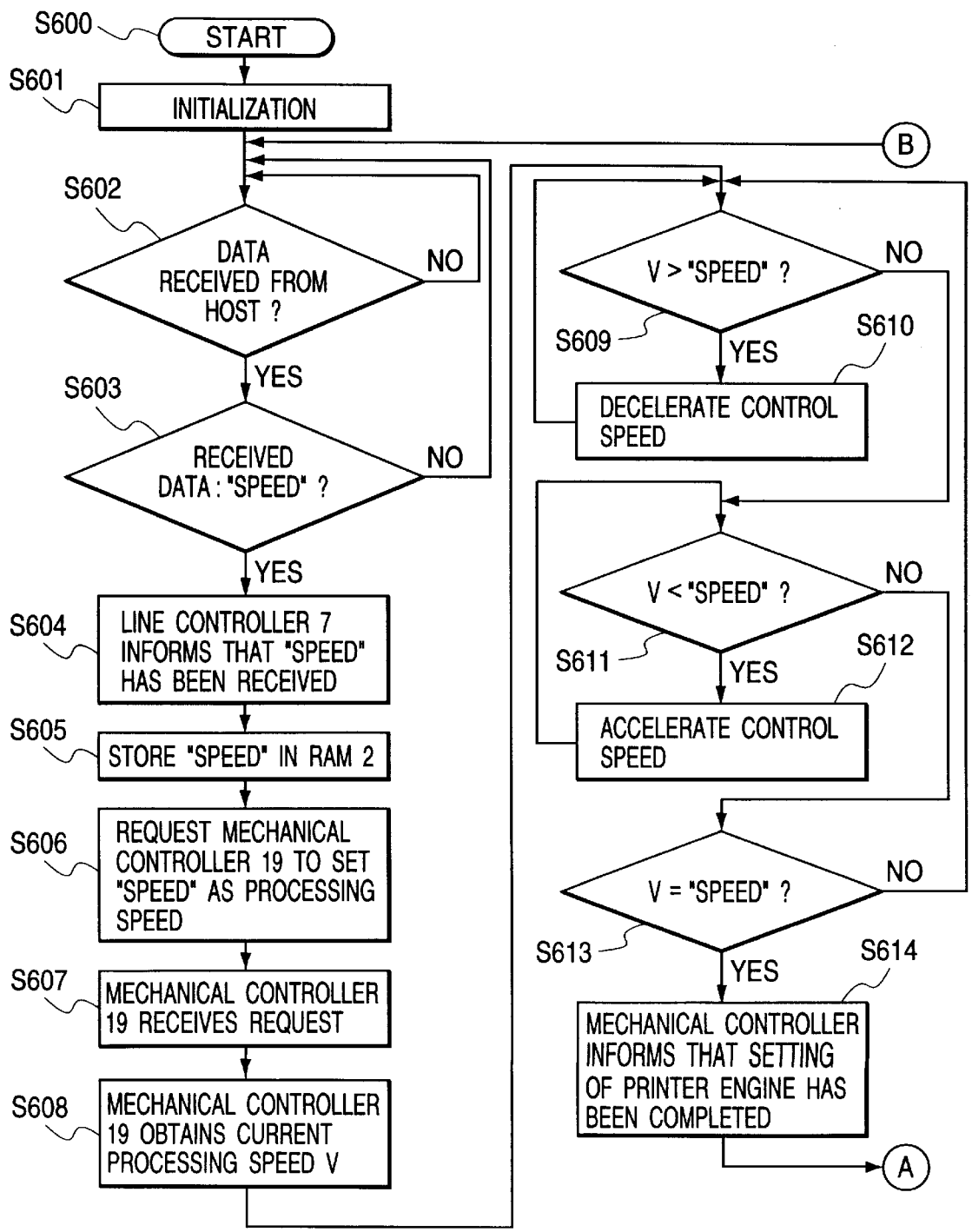

PROCESSING IN PRINTING

SYSTEM FOR CONVERTING PRINT INSTRUCTION INTO IMAGE DATA OR PRINT DATA BASED ON WHETHER A RASTERIZATION LEVEL IS OF A FIRST LEVEL OR A SECOND LEVEL

BACKGROUND OF THE INVENTION

1. Field of the Invention

The present invention relates to an information processing apparatus and an information processing method of transmitting data via an interface and printing it with a printing apparatus.

2. Related Background Art

In printing data generated by an application with a printer, both a host computer and the printer have conventionally performed print processes, considering the line type and data transmission rate not at all.

Conventionally, the host computer has converted data and transmitted it to the printer, considering the connected line type, data transmission capacity and printer performance not at all.

Conventionally, even if a line has a data transmission capacity varying with time, the printer has performed print processes at a single speed without considering the line transmission rate.

Both the host computer and printer have performed print processes, considering the line type and data transmission capacity not at all, so that a print efficiency is poor.

The host computer converts data independently from the line type and data transmission capacity. Therefore, if data is converted into a data format matching a low transmission capacity irrespective of a high data transmission capacity of the line, data imposing a load on the printer is transmitted.

For example, if PDL (page descriptive language) data is transmitted although it takes not so long a time to transmit image data, the printer has a load such as data development so that a total print speed becomes lower than when image data is transmitted.

If data is converted into a data format matching a high transmission capacity, the amount of transmission data becomes large so that it takes a long time to transmit data if the transmission capacity is small.

For example, if image data is transmitted when the data transmission capacity is low, it takes a long time to transmit it and the total print speed lowers.

SUMMARY OF THE INVENTION

It is an object of the present invention to perform optimum print processes matching a data transmission capacity.

The printer has performed print processes at a constant print speed irrespective of whether the transmission capacity is high or low.

If the print speed of the printer is made fast, a print overrun may occur when the data transmission capacity is low.

If the print speed of the printer is made low, printing is performed at a low speed even if the data transmission speed is high.

It is therefore another object of the present invention to perform optimum print processes matching the data transmission capacity and the print speed.

According to a first aspect of the present invention solving the above object, an information processing apparatus is provided in which a conversion unit generates converted output data and a communications unit transmits the converted output data to an external output apparatus. The information processing apparatus comprises: acquiring means for acquiring discrimination information to be used for discrimination of a data transmission state of the communications unit; conversion control means for controlling the conversion of data by the conversion unit in accordance with the discrimination information acquired by the acquiring means; and communications control means for transmitting from the communications unit the output data from the conversion unit converted under control of the conversion control means.

According to a second aspect of the present invention solving the above object, an output control apparatus is provided in which an output unit outputs data input from a communications unit, the output control apparatus comprises: acquiring means for acquiring discrimination information to be used for discrimination of a data transmission state of the communications unit; and control means for controlling a data output speed of the output unit in accordance with the discrimination information acquired by the acquiring means.

BRIEF DESCRIPTION OF THE DRAWINGS

FIG. 7 shows the format of a printer connection table.

FIG. 8 shows an example of a rasterization level table.

FIG. 10 shows graphical patterns described with the first embodiment.

FIG. 11 is a broken diagram of the graphical patterns described with the first embodiment.

FIG. 15 is an internal block diagram showing an example of the printer of the embodiment.

DETAILED DESCRIPTION OF THE PREFERRED EMBODIMENTS

The outline of the invention will be described with reference to the accompanying drawings.

Figure 1:
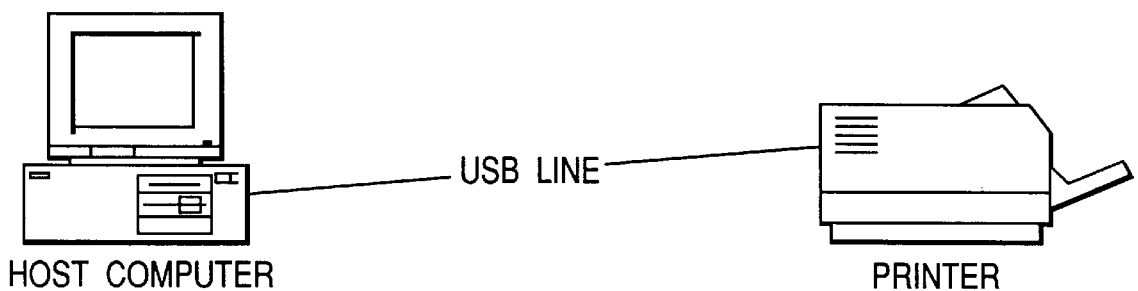
FIG. 1 is a schematic diagram showing the structure of a system in which a host computer is connected via USB line to a printer.
Figure 2:
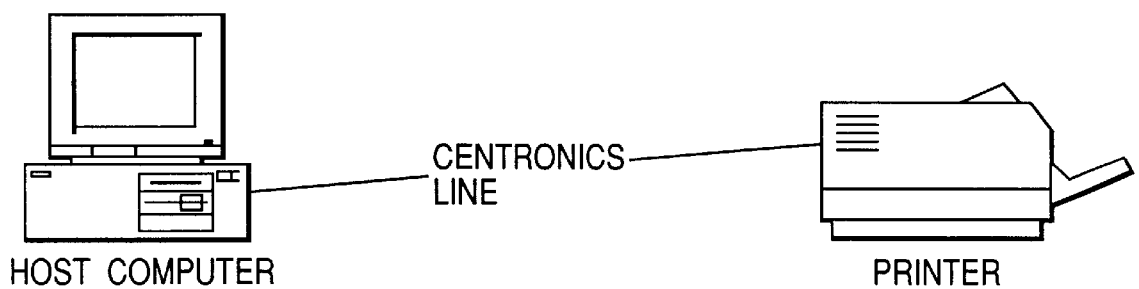
FIG. 2 is a schematic diagram showing the structure of a system in which a host computer is connected via Centronics line to a printer.
Figure 3:
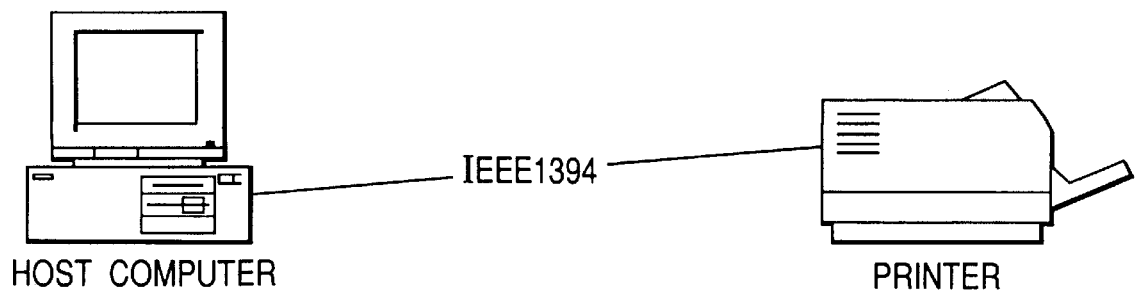
FIG. 3 is a schematic diagram showing the structure of a system in which a host computer is connected via an IEEE 1394 line to a printer.

FIGS. 1 to 3 show examples of system configurations applied to the present invention.

FIG. 1 is a schematic diagram showing the structure of a system in which a host computer is connected via a USB line to a printer.

FIG. 2 is a schematic diagram showing the structure of a system in which a host computer is connected via a Centronics line to a printer.

FIG. 3 is a schematic diagram showing the structure of a system in which a host computer is connected via an IEEE 1394 line to a printer.

Figure 4:
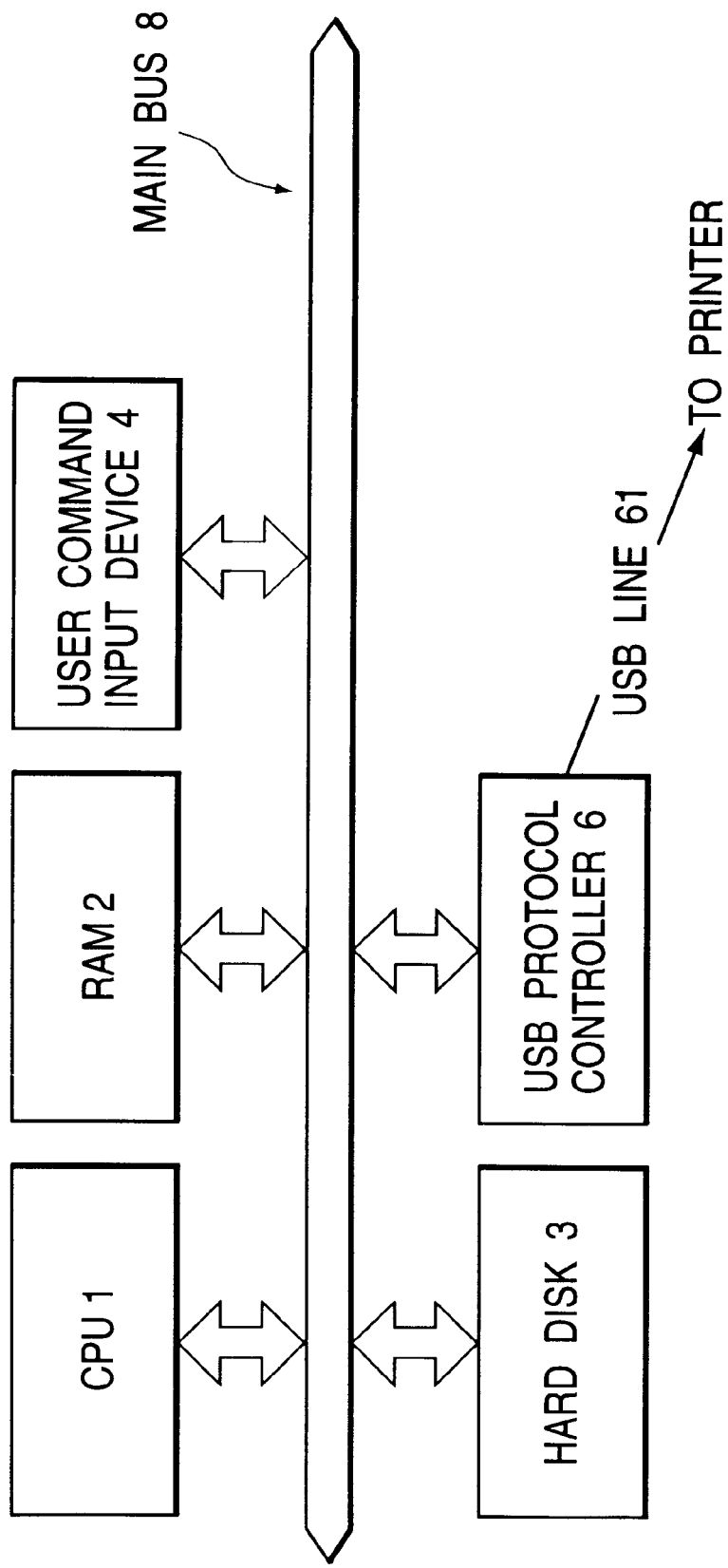
FIG. 4 is a diagram showing an example of the structure of a host computer to be connected to a USB line.
Figure 5:
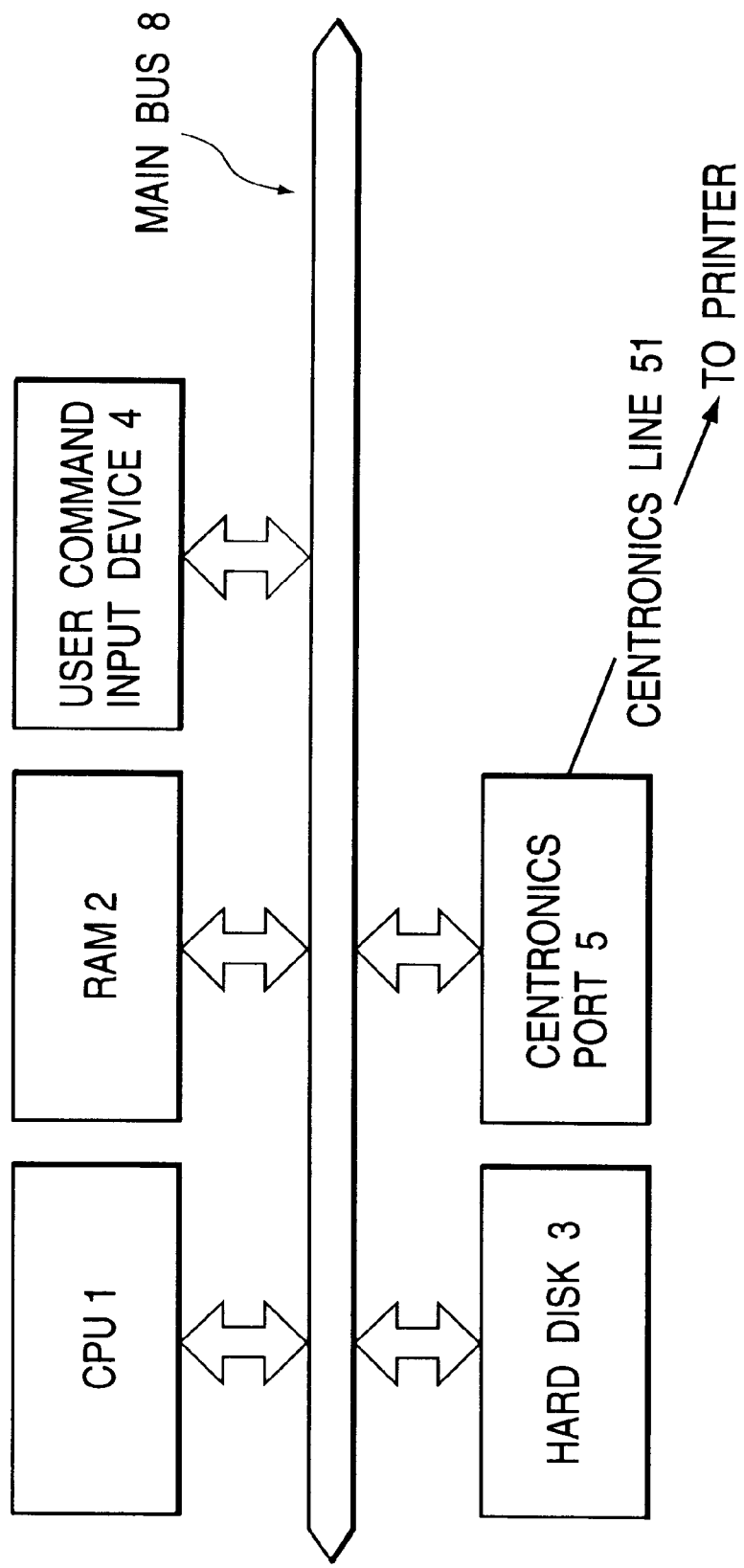
FIG. 5 is a diagram showing an example of the structure of a host computer to be connected to a Centronic line.
Figure 6:
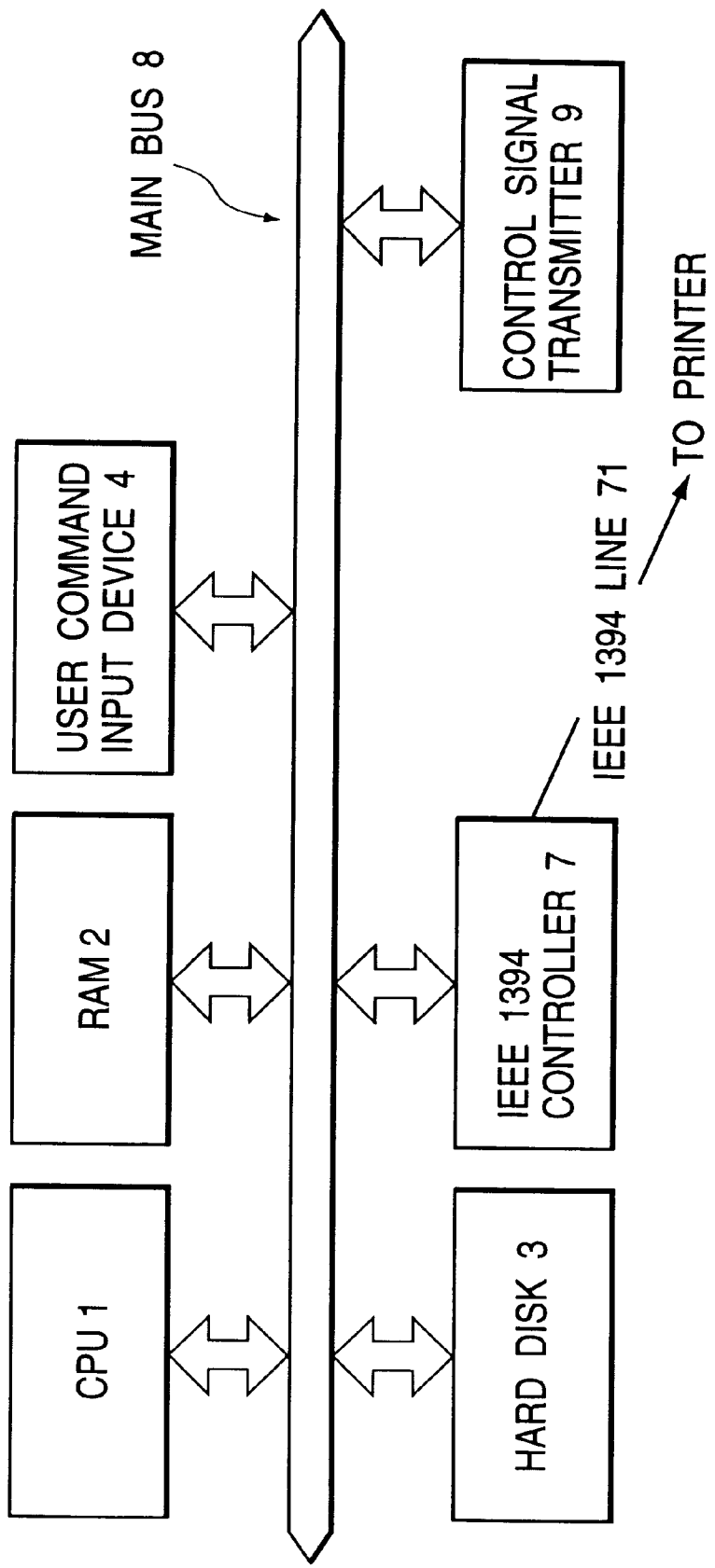
FIG. 6 is a diagram showing an example of the structure of a host computer to be connected to an IEEE 1394 line.

FIGS. 4 to 6 show the block diagrams showing the internal structures of the host computers respectively shown in FIGS. 1 to 3. Reference numeral 1 represents a CPU, 2 represents a RAM as a working area of CPU 1, 3 represents a hard disk (or floppy disk, CD-ROM, MO, ROM, etc.) for storing programs, 5 represents a Centronics port, 51 represents a Centronics line to be connected to a printer, 61 represents a USB line to be connected to a printer, 71 represents an IEEE 1394 line to be connected to a printer, and 8 represents a main bus.

Unless otherwise specified, CPU 1 of the host computer controls RAM 2, hard disk 3, Centronics port 5, a USB protocol controller 6, and an IEEE 1394 controller 7 respectively connected to the main bus 8.

Figure 31:
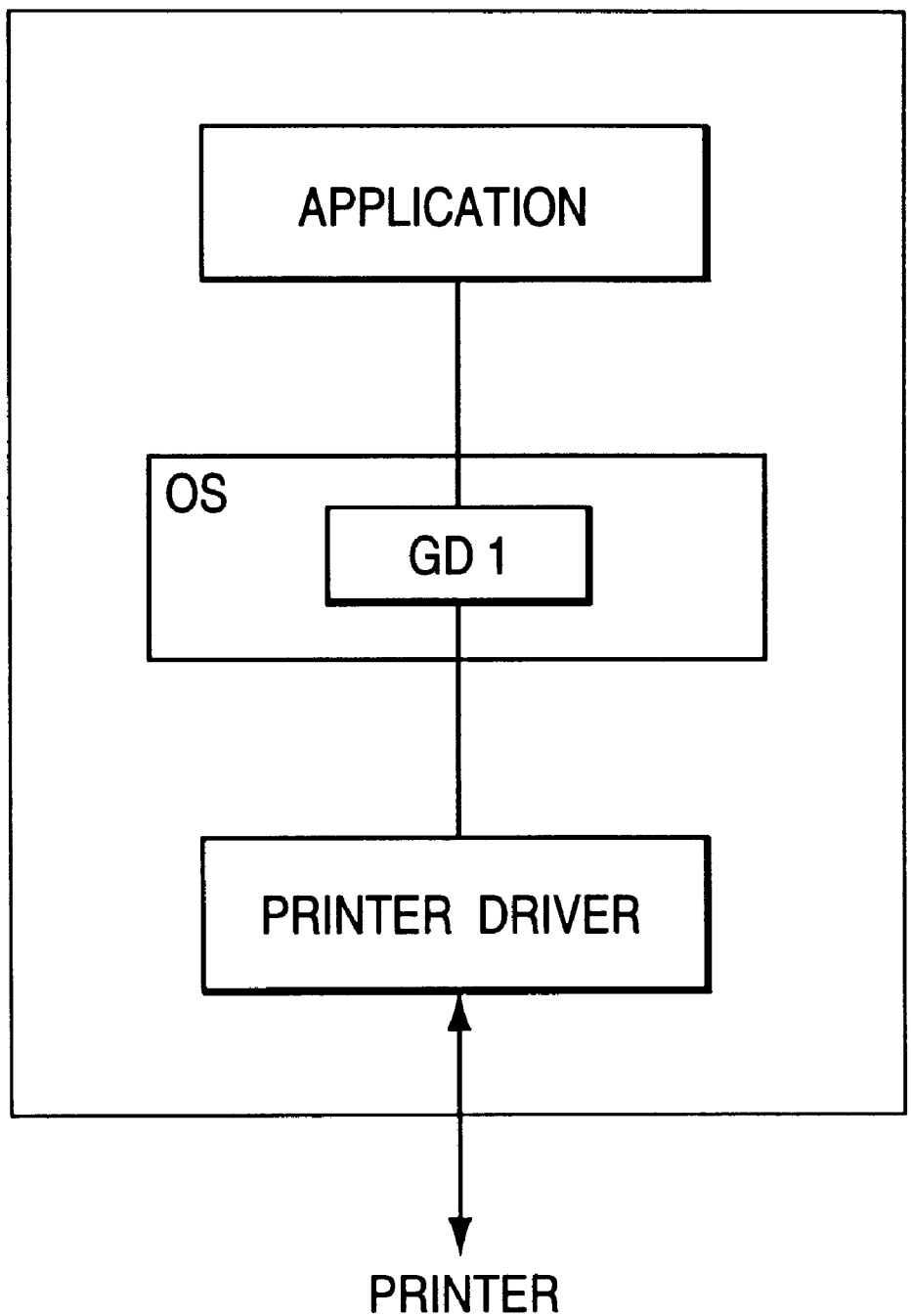
FIG. 31 shows the structure of a program stored in a hard disk.

Programs to be stored in the hard disk 3 have the structure shown in FIG. 31.

In executing each program, CPU 1 reads the program from the hard disk 3 and writes it in RAM 2, and CPU 1 reads the program from RAM 2 to execute it. Each time a process stage is changed, a different program is used. In the following description, the sentences "an application transmits data to a printer driver" and "a printer driver converts the data" are used. These sentences strictly mean that "CPU 1 processes data by using an application, and processes it thereafter by using the printer driver" and "CPU 1 converts data by using the printer driver". The program itself does not process, but the program used for processing is an application or a printer driver.

Figure 32:
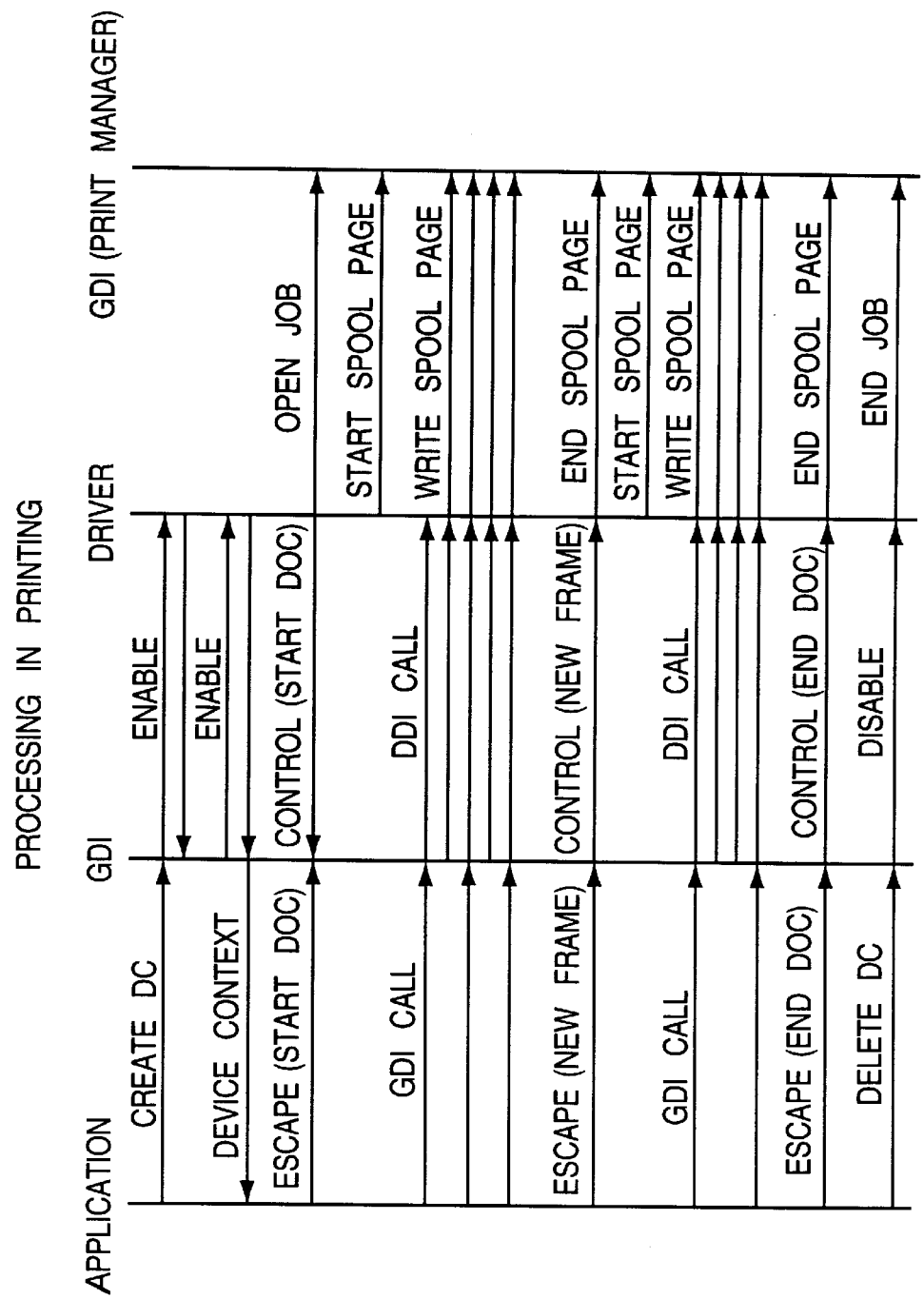
FIG. 32 is a diagram showing a process flow of modules during printing.

How the data generated by an application is transmitted to the printer in the form of PDL or image data will be briefly described with reference to FIGS. 31 and 32.

As the application generates data, it inquires about the printer performance from GDI in order to determine the data format. GDI then inquires about the printer performance from the printer driver. When the printer performance is acquired, it is returned back to the application in the format of GDI function. This data is called a device context (DC). The application sends a transmission start signal to GDI, and GDI sends a transmission start signal to the printer driver.

After the transmission start signal is sent, the application transmits data in the format of GDI function to GDI. GDI converts it in the format of DDI function and transmits the data to the printer driver.

In the present invention, the printer driver converts the received data in the format of DDI function into PDL or image data in accordance with the connected interface type and printer type, and sends the converted data to the printer. The details thereof will be given in the following.

(First Embodiment)

The printer connection table shown in FIG. 7 will be described.

The printer connection table is stored in RAM 2 and dynamically updated. Each time a new printer driver is installed, a printer name item is added. When the printer driver is installed, a line type is discriminated and stored in RAM 2. The line type can be discriminated through detection by the USB protocol controller 6 shown in FIG. 4, by the Centronics port 5 shown in FIG. 5 or by the IEEE 1394 controller 7 shown in FIG. 6. Specifically, the line type is discriminated by a user designation, by a Plug and Play function, or by an operating system.

Next, the rasterization table shown in FIG. 8 will be described. This table is stationary present in the program of the invention, and developed on RAM 2 when the program is loaded.

The execution procedure of the invention will be detailed with reference to the flow chart shown in FIG. 9.

It is assumed that the printer driver has been installed already and that the printer connection table has been already stored in RAM 2.

A user generates image data, character data or the like by using the application (S101).

The user selects a desired printer by using a user command input device 4 (S102).

The description of this selection method is omitted because it is not directly relevant to the invention. The selection information (printer name and the like) of the printer is stored in RAM 2 (S103).

The user notifies the application of a print start instruction, by using the user command input device 4 (S104). The printer selection information is read from RAM 2 (S105) and a corresponding printer driver is loaded in RAM 2 (S106).

Next, with reference to the printer connection table shown in FIG. 7, the type of the line connected to the printer having the printer name stored in RAM 2 is acquired (S107) and stored in RAM 2 (S108).

A rasterization level is determined with reference to the rasterization table shown in FIG. 8 (S109).

This rasterization level is determined by referring to the rasterization table by using as parameters the printer name and line type stored in RAM 2. The determined rasterization level is stored in RAM 2 (S110).

Next, a print command sent from the application is received (S111).

The received print command is stored in the hard disk 3 (S112).

In accordance with the rasterization level in RAM 2, the print command is converted into print data (S113). Print data has a format which the printer can understand.

Figure 12B:
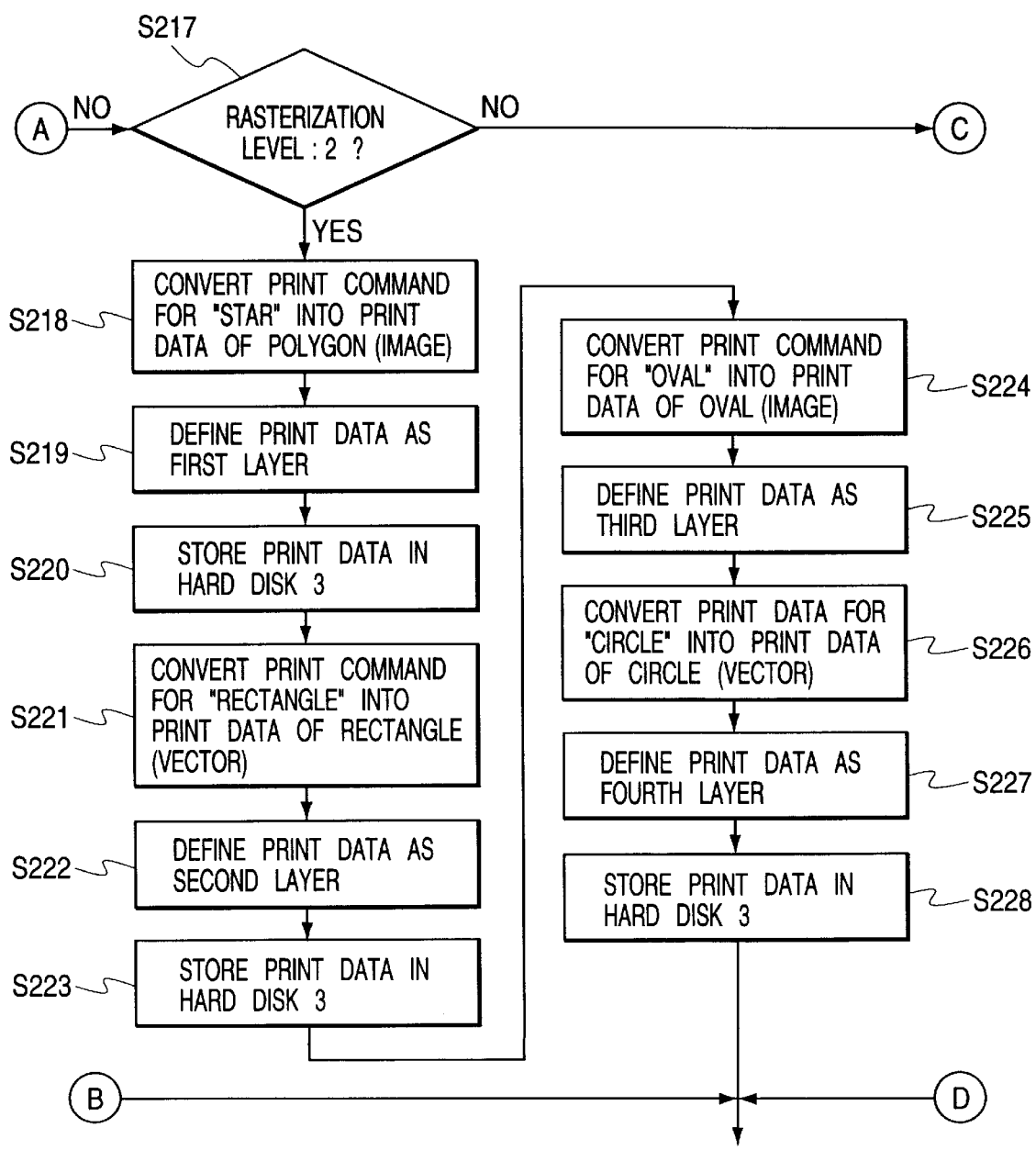
FIG. 12 which is composed of FIGS. 12A, 12B and 12C are flow charts illustrating a rasterizing method which considers the rasterization level according to the first embodiment.
Figure 12C:
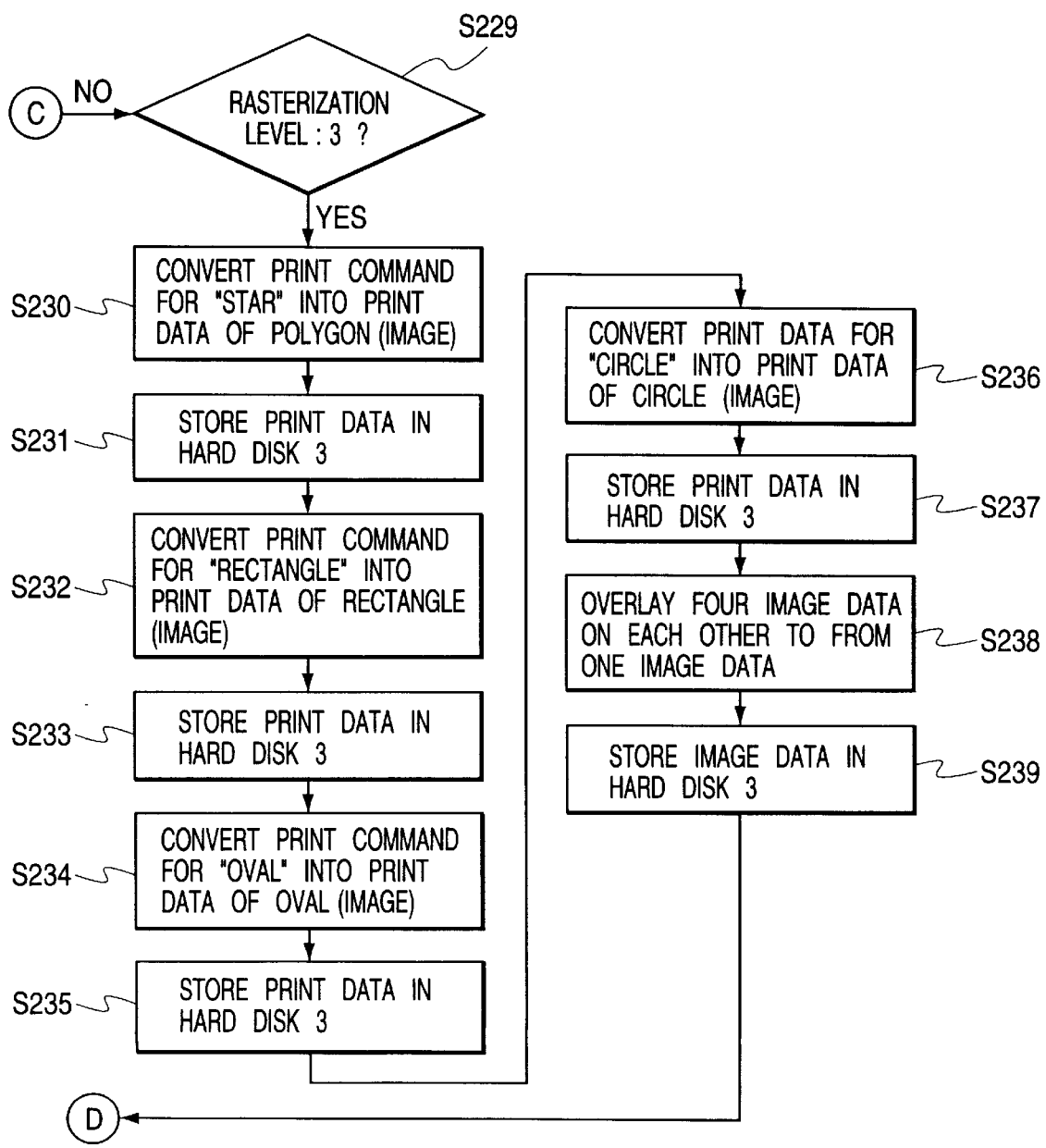

A method of converting the print command into the print data by using the rasterization level will be described by taking graphical patterns such as shown in FIG. 10 as an example. The processes of printing four graphical patterns shown in FIG. 11, divided from the graphical patterns shown in FIG. 10 in response to the print command from the application, will be described with reference to the flow charts of FIGS. 12A to 12C.

The print command processed by the printer driver has the format of DDI function. The print data is PDL if the graphical data itself is transmitted, and image data if it is converted into image data.

The printer driver receives a print command for the star graphical pattern from the application via GDI (S201), and stores it in the hard disk 3.

Next, the printer driver receives a print command for the rectangle graphical pattern from the application via GDI (S202), and stores it in the hard disk 3.

Next, the printer driver receives a print command for the oval graphical pattern from the application via GDI (S203), and stores it in the hard disk 3.

Finally, the printer driver receives a print command for the circle graphical pattern from the application via GDI (S204), and stores it in the hard disk 3.

Next, the rasterization level is read from RAM 2 and checked whether it is a level 1, 2, or 3 (S205, S217, S229).

(Rasterization Level 1)

The print command for the star graphical pattern is read from the hard disk 3, and converted into print data in a vector mode representing a polygon having apex coordinates (S206).

The print data is defined as the first layer (lowest layer) (S207).

The print data is stored in the hard disk 3 (S208).

Next, the print command for the rectangle graphical pattern is read from the hard disk 3, and converted into print data in a vector mode representing a rectangle (S209).

The print data is defined as the second layer (S210).

The print data is stored in the hard disk 3 (S211) Next, the print command for the oval graphical pattern is read from the hard disk 3, and converted into print data in a vector mode representing an oval (S212).

The print data is defined as the third layer (S213).

The print data is stored in the hard disk 3. Lastly, the print command for the circle graphical pattern is read from the hard disk 3, and converted into print data in a vector mode representing a circle (S214). The print data is defined as the fourth layer (S215). The print data is stored in the hard disk 3 (S216).

(Rasterization Level 2)

The print command for the star graphical pattern is read from the hard disk 3, and converted into print data of image data representing the star whose black/white of each bit is represented by binary or multi values (S218).

The print data is defined as the first layer (lowest layer) (S219).

The print data is stored in the hard disk 3 (S220).

Next, the print command for the rectangle graphical pattern is read from the hard disk 3, and converted into print data in a vector mode representing a rectangle (S221).

The print data is defined as the second layer (S222).

The print data is stored in the hard disk 3 (S223).

Next, the print command for the oval graphical pattern is read from the hard disk 3, and converted into print data of image data representing the oval whose black/white of each bit is represented by binary or multi values (S224). The print data is defined as the third layer (S225).

The print data is stored in the hard disk 3. Lastly, the print command for the circle graphical pattern is read from the hard disk 3, and converted into print data in a vector mode representing a circle (S226).

The print data is defined as the fourth layer (S227).

The print data is stored in the hard disk 3 (S228).

(Rasterization Level 3)

The print command for the star graphical pattern is read from the hard disk 3, and converted into print data of image data representing the star whose black/white of each bit is represented by binary or multi values (S230).

The print data is stored in the hard disk 3 (S231).

Next, the print command for the rectangle graphical pattern is read from the hard disk 3, and converted into print data of image data representing the rectangle whose the black/white of each bit is represented by binary or multi values (S232).

The print data is stored in the hard disk 3 (S233).

Next, the print command for the oval graphical pattern is read from the hard disk 3, and converted into print data of image data representing the oval whose black/white of each bit is represented by binary or multi values (S234).

The print data is stored in the hard disk 3 (S235).

Lastly, the print command for the circle graphical pattern is read from the hard disk 3, and converted into print data of image data representing the circle whose black/white of each bit is represented by binary or multi values (S236).

The print data is stored in the hard disk 3 (S237). The four image data are read from the hard disk 3 and superposed one upon another while considering the layers and transparency to form a single frame of image data (S238). The superposed image data is stored in the hard disk (S239).

The line controllers 5 to 7 corresponding to the line type stored in RAM 2 is requested to transmit the print data to the printer (S115).

The line controller 5 to 7 reads the print data from the hard disk 3 (S116), and transmits it via the designated line 19 to the printer (S117) to thereafter terminate the procedure (S118).

(Second Embodiment)

In the first embodiment, graphical patterns are used by way of example. In the second embodiment, the case will be described wherein the same character is used a plurality of times in the same job. When a character is first converted into print data, image data of the character and the image data identifier are transmitted to the printer which prints the image data of the character and at the same time registers the identifier. When the character is used at the second or later time, the host computer transmits only the image data identifier, and the printer prints the character image data registered in the printer together with the identifier.

If the rasterization level is a predetermined value or higher, the character data is all converted into print data of image data by the host computer, whereas if the level is lower than the predetermined value, for the character to be transmitted at the second time or later, only the data identifier is transmitted to the printer. This control method may be applied.

In determining the rasterization level, the processes same as S100 to S110 are performed, and the above control is performed at S110 and later steps.

(Third Embodiment)

In many cases, host computers and printers are connected by RS-232C or so called Centronics. The transmission rate of such a line is often too low as compared to the processing capacity of a printer. It is therefore possible that a host computer generates print data, compresses it and transmits it and the printer expands the received compressed print data, and if necessary, performs a data conversion process and prints it out.

From the above reason, the rasterization level may be used in determining from the line type whether the print data is to be compressed, and if compressed, what compression method is to be used. Namely, a plurality of compression methods are prepared in a printer, and the compression method is determined in accordance with the rasterization level.

(Fourth Embodiment)

In the first embodiment, the transmission rate is predicted in accordance with the line type, and the rasterization level matching the predicted transmission rate is determined. Among isochronous transmission lines such as IEEE 1394, there is a line whose isochronous transmission bandwidth to be acquired varies with the line condition. In such a case, the isochronous transmission bandwidth may be acquired before the print data is generated, and the rasterization level is determined in accordance with the acquired bandwidth (transmission rate). The bandwidth of isochronous transmission will be later described. The process of acquiring the bandwidth will be described with reference to FIG. 6.

First, CPU 1 inquires about a bandwidth from the IEEE 1394 controller 7.

If the host computer is a root, the bandwidth is managed by RAM 2. Therefore, in response to the inquiry, the bandwidth is acquired from RAM 2.

If the host computer is a leaf, the IEEE 1394 controller 7 inquires about a bandwidth from the root. In response to this inquiry, the bandwidth information is returned back.

In accordance with the bandwidth information, the rasterization level is determined.

For example, if the acquired bandwidth is larger than 40 $\mu$s, the rasterization level is set to "3", if the acquired bandwidth is in a range from 40 $\mu$s to 20 $\mu$s, the rasterization level is set to "2", and if the acquired bandwidth is 20 $\mu$s or smaller, the rasterization level is set to "3".

If a judgement table indicating the above correspondence is stored in RAM 2, the rasterization level can be determined from the bandwidth by referring to the judgement table. In accordance with the judgement result, the print command is converted into print data similar to the first embodiment, and transmitted to the printer.

Figure 9:
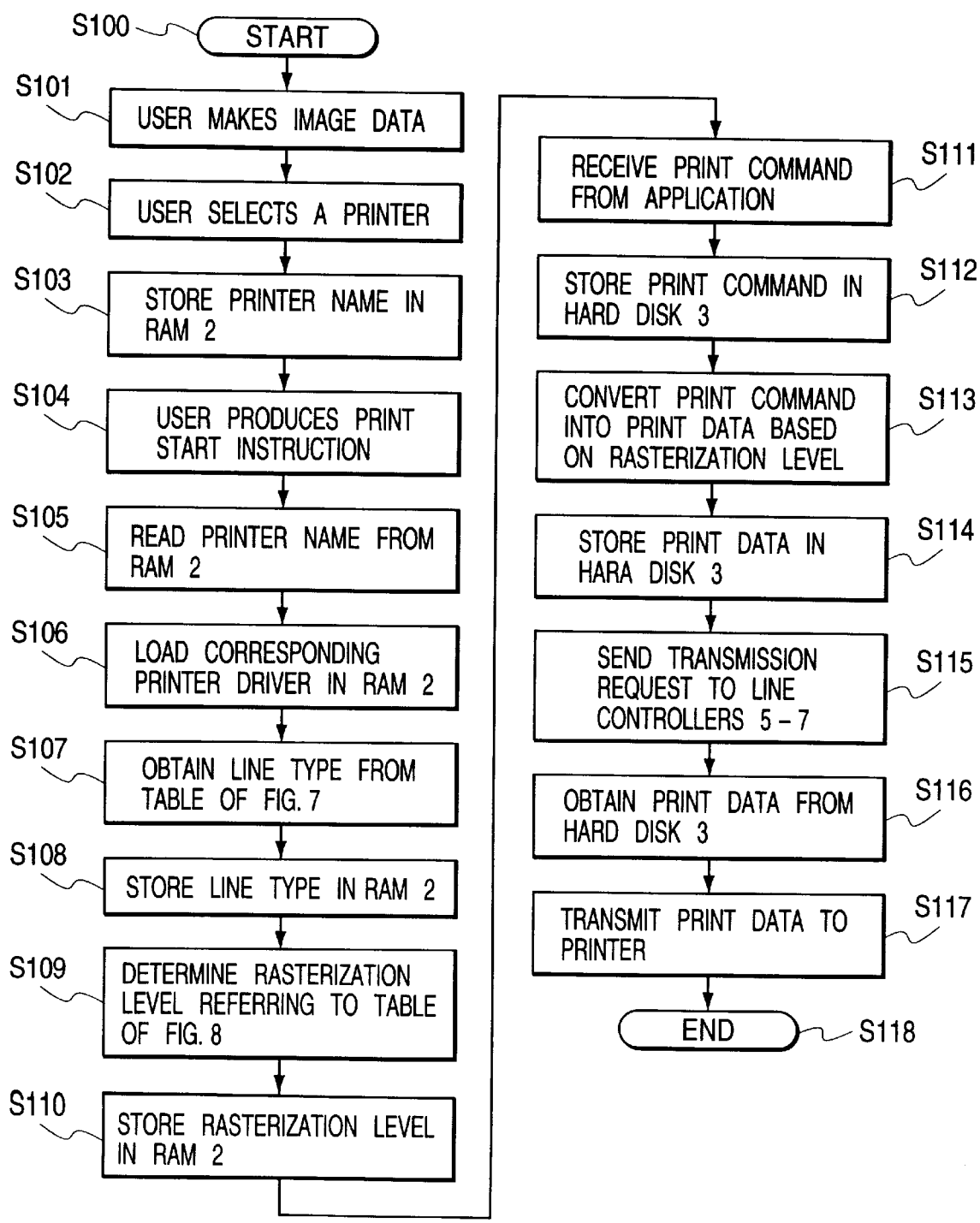
FIG. 9 is a flow chart illustrating the main processes according to a first embodiment.

The processes after the rasterization level is determined are similar to S112 and following steps of the first embodiment shown in FIG. 9.

The data transmission rate of IEEE 1394 can be changed and acquired in the similar manner to the bandwidth. The rasterization level may be determined therefore in accordance with the data transmission rate.

The data transmission rates of IEEE 1394 include three rates of 100/200/400 bps as will be later described. If the transmission rate is 100 bps, the rasterization level is set to "1", if the transmission rate is 200 bps, the rasterization level is set to "2", and if the transmission rate is 400 bps, the rasterization level is set to "3". In this manner, the rasterization level may be determined.

The processes after the rasterization level is determined are similar to S112 and following steps of the first embodiment shown in FIG. 9.

Figure 33:
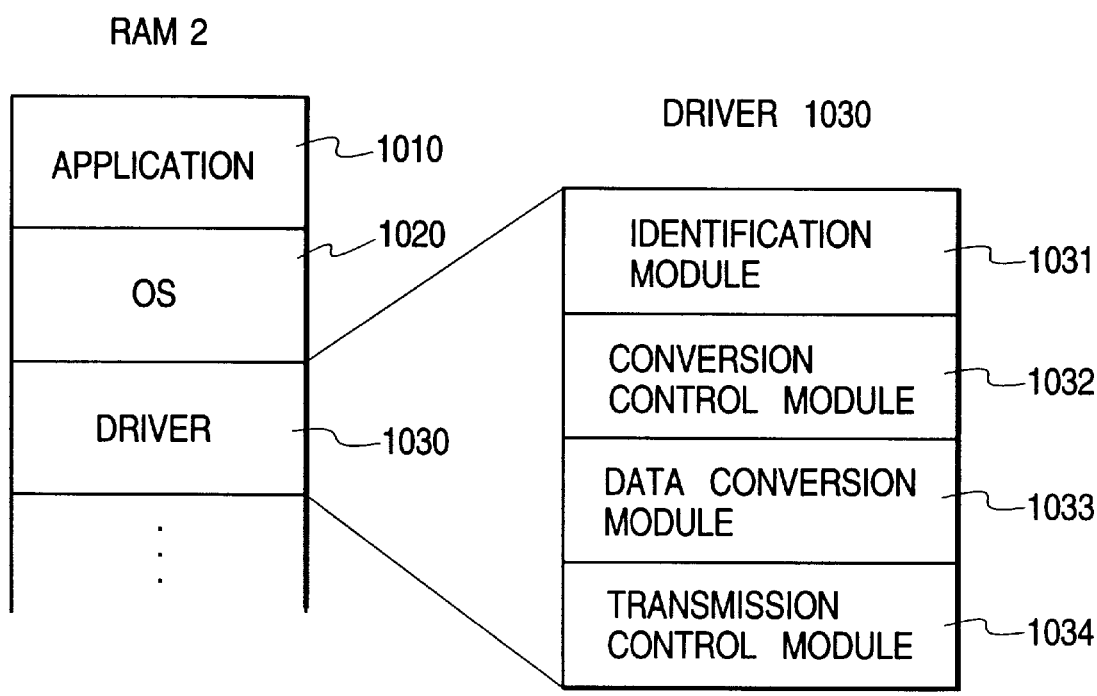
FIG. 33 is a diagram showing the memory map of a program applicable to the first to fourth embodiments.

A program realizing the functions of the first to fourth embodiments may be externally supplied to RAM 2 to embody the present invention by reading the program from RAM 2. This system configuration is shown in FIG. 33.

RAM 2 stores an application 1010, an OS 1020, and an externally supplied printer driver 1030.

The application 1010 is a module for generating original data based on which the print data is supplied to the printer, and supplying the original data to OS 1020. The format of this data supplied to OS 1020 is the GDI format described previously.

For example, if it is instructed that data generated by word processor software which is a kind of the application 1010 is to be printed, OS processes this data at that time.

OS 1020, particularly its GDI program, is a module for converting the data of GDI formation supplied from the application into data of DDI format. The data of DDI format converted by the GDI 1020 is processed by the printer driver 1030. The printer driver 1030 is a module for converting the data of DDI format into PDL or image data and transmitting it to the printer. The details of the printer driver will be given in the following.

The printer driver 1030 is constituted of an identification module 1031, a conversion control module 1032, a data conversion module 1033 and a transmission control module 1034.

The identification module 1031 is a module for identifying the type of a line, the type of a printer, and if the connected line is IEEE 1394, a data transmission rate and a bandwidth usable for isochronous data transmission. The identification module 1031 executes S103 to S108 in the flow chart shown in FIG. 9.

After the identification module 1031 acquires the above information, the process is passed to the next conversion control module 1032.

The conversion control module 1032 is a module for determining a rasterization level in accordance with the type of a line, the type of a printer, the data transmission rate and bandwidth usable for isochronous data transmission. The conversion control module 1032 executes S109 to S110 in the flow chart shown in FIG. 9.

The data conversion module 1033 is a module for converting the data of DDI format supplied from OS 1020 into image data or data of PDL format, in accordance with the designated rasterization level. The data conversion module 1033 executes S111 to S114 in the flow chart shown in FIG. 9.

The transmission control module 1034 is a module for transmitting the converted image data or data of PDL format to the printer via the line controller 5 to 7. The transmission control module 1034 executes S115 to S117 in the flow chart shown in FIG. 9.

(Fifth Embodiment)

Figure 13:
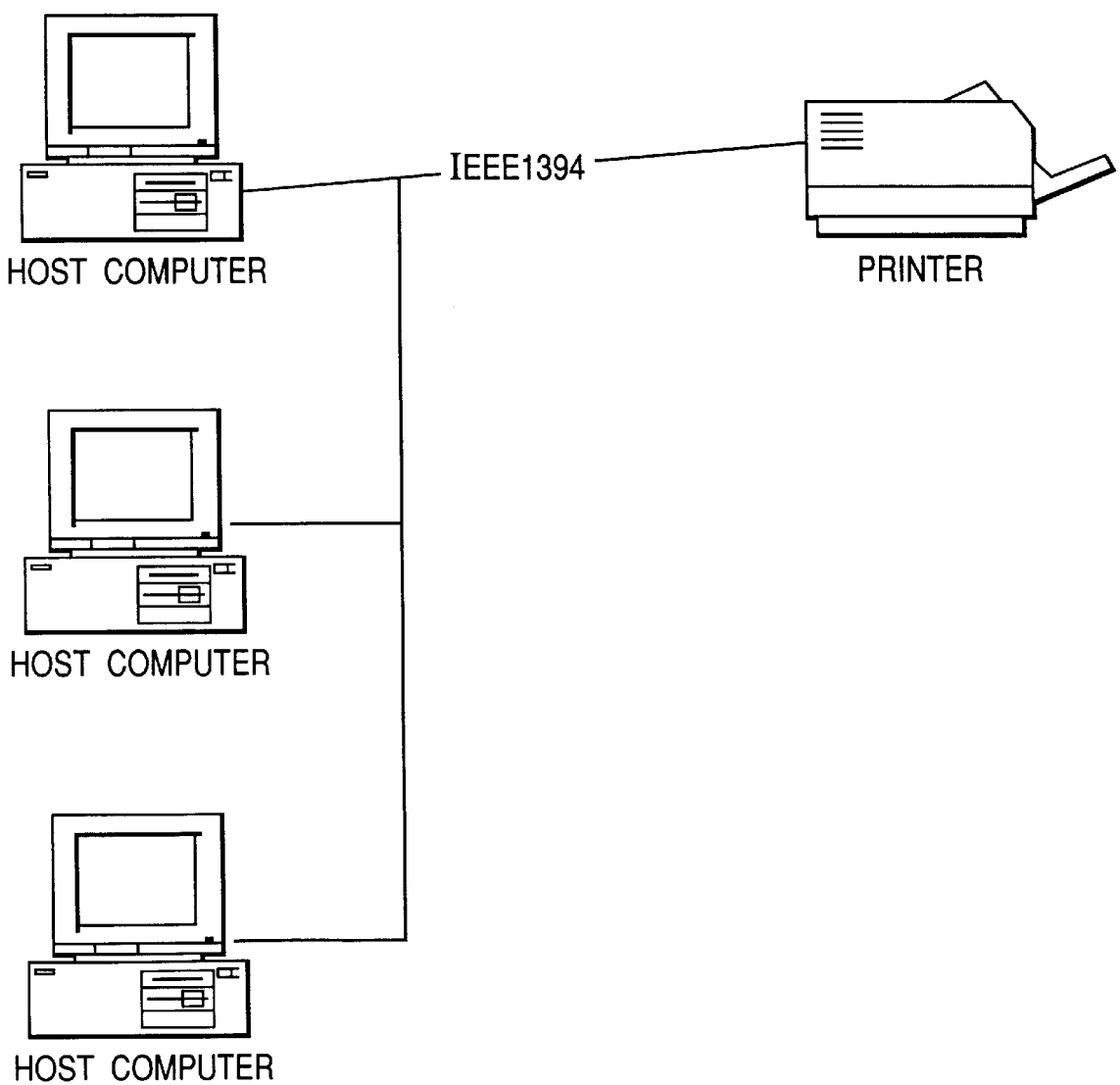
FIG. 13 shows an example of the system structure embodying the present invention.

FIG. 13 shows an example of a system configuration embodying the invention.

Figure 14:
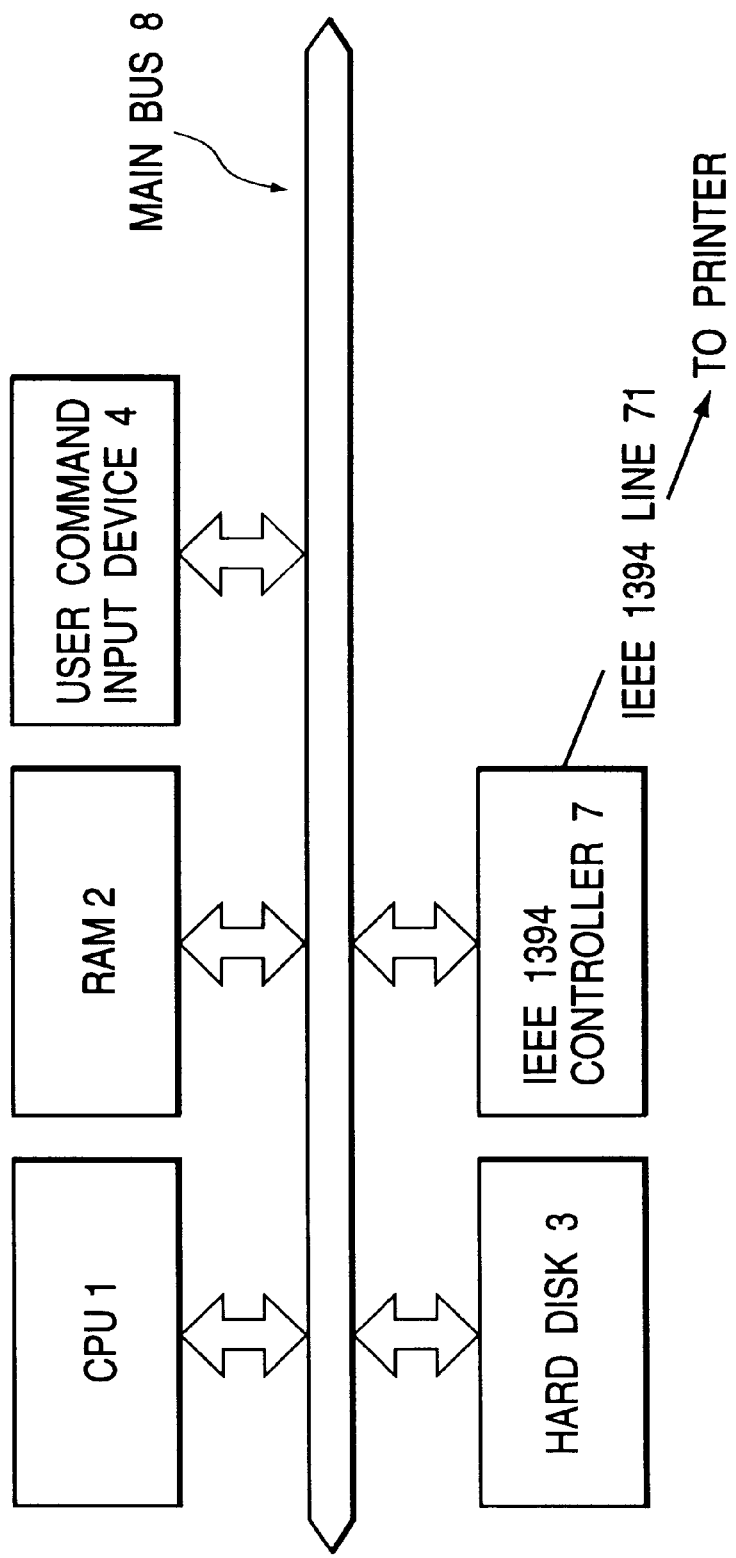
FIG. 14 is an internal block diagram showing an example of the host computer of the embodiment.
Figure 16B:
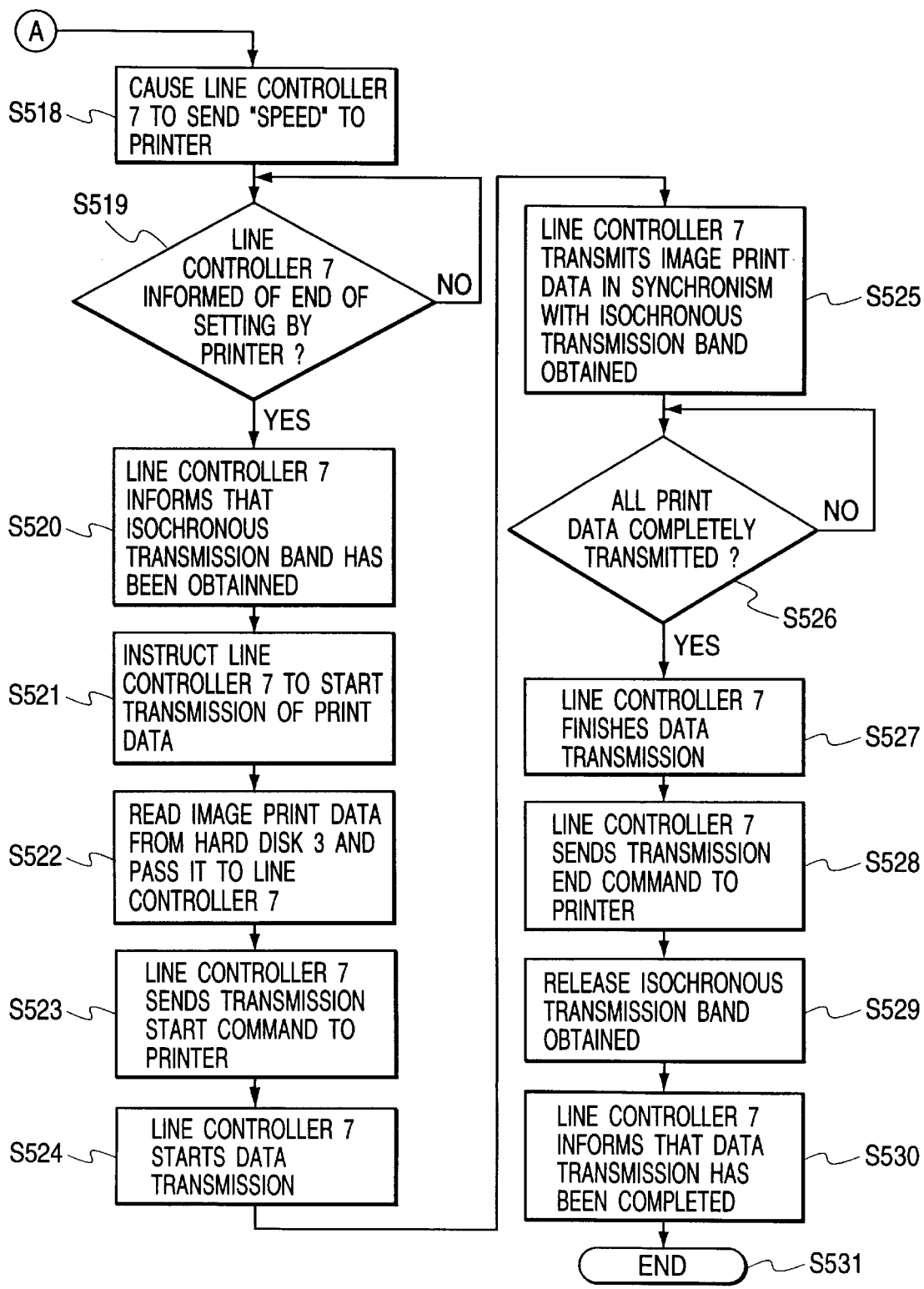
FIG. 16 which is composed of FIGS. 16A and 16B are flow charts illustrating the operation to be executed by the host computer of the first embodiment.
Figure 17B:
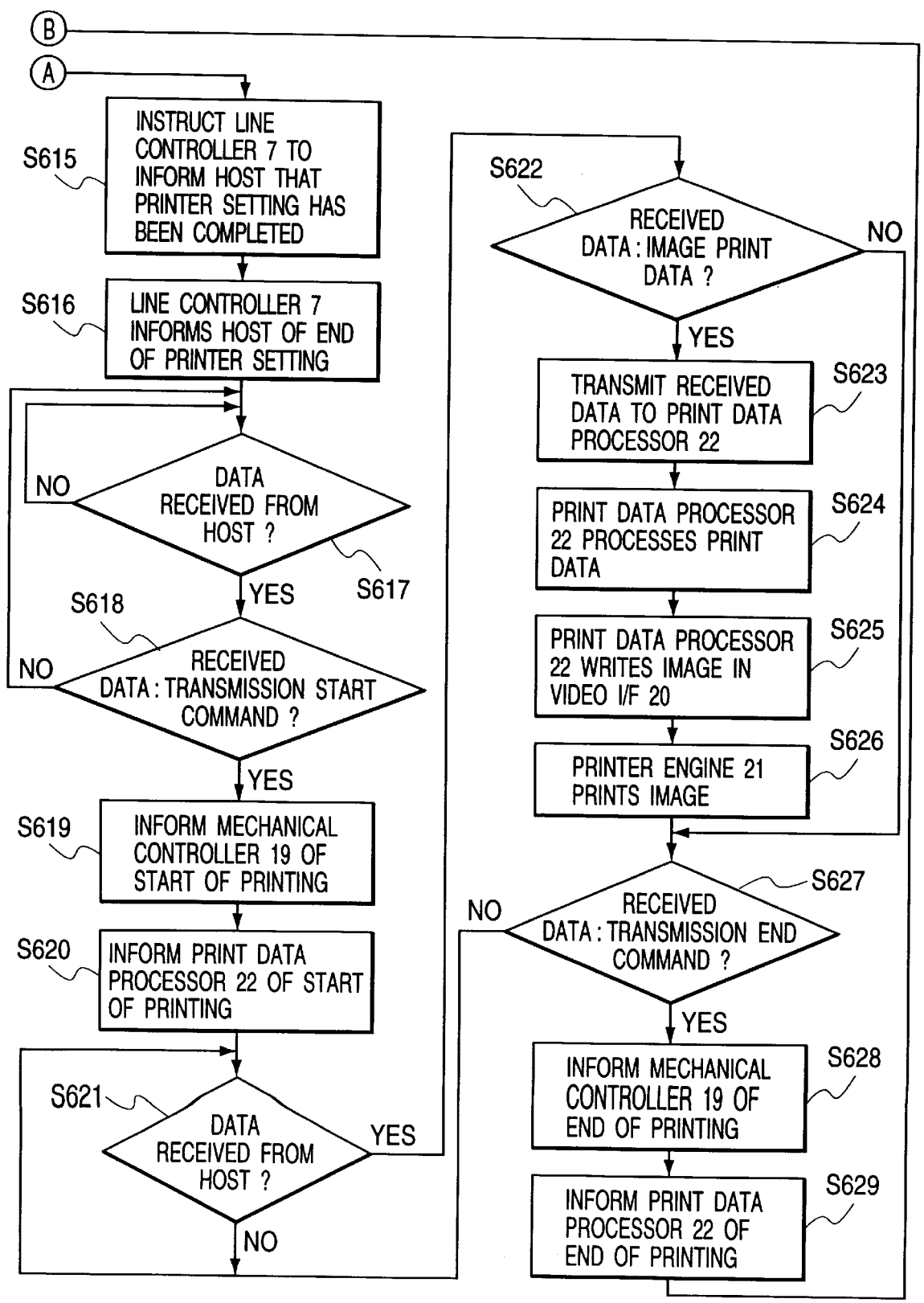
FIG. 17 which is composed of FIGS. 17A and 17B are flow charts illustrating the operation to be executed by the printer of the first embodiment.

FIG. 14 is a block diagram showing the internal structure of a host computer embodying the invention. Like elements to those shown in FIG. 6 are represented by identical reference numerals. Reference numeral 1 represents a CPU, 2 represents a RAM as a working area of CPU 1, 3 represents a hard disk (or floppy disk, CD-ROM, MO, ROM, magnetic tape, etc.) for storing programs, 4 represents a user command input device, 7 represents a line controller (in this example, IEEE 1394), 71 represents a line to be connected to a printer, the line being capable of isochronous data transmission (in this example, IEEE 1394), and 8 represents a main bus.

FIG. 15 is a block diagram showing the internal structure of a printer embodying the invention.

Reference numeral 11 represents a CPU, 12 represents a RAM as a working area of CPU 11, 13 represents a hard disk (or floppy disk, CD-ROM, MO, ROM, magnetic tape, etc.) for storing programs.

Reference numeral 17 represents a line controller (in this example, IEEE 1394).

Reference numeral 171 represents a line to be connected to a printer, the line being capable of isochronous data transmission (in this example, IEEE 1394).

Reference numeral 18 represents a main bus and 19 represents a mechanical controller for controlling a print mechanism of the printer.

Reference numeral 22 represents a print data processor for processing received print data, 20 represents a video I/F for storing image data converted from the print data, and 21 represents a printer engine for performing actual printing, the details of the printer engine being later given with reference to FIGS. 18 and 19.

Reference numeral 23 represents a processing speed sensor for detecting an operation speed of the printer engine.

Unless otherwise specified, CPU 1 of the host computer controls RAM 2, hard disk 3, user command input device 4, and line controller 7 respectively connected to the main bus 8.

CPU 11 of the printer controls RAM 12, ROM 13, line controller 17, mechanical controller 19, and print data processor 22 respectively connected to the main bus 18. The processing speed sensor 23 always monitors the operation speed of the printer engine 21 and informs the monitor result to the mechanical controller 19.

The operation of the host computer will be first described.

A user generates image data, character data or the like by using an application or the like (S501). The user selects a desired printer by using the user command input device 4 (S502). The selection information (printer name and the like) of the printer is stored in RAM 2 (S503).

The user notifies the application of a print start instruction, by using the user command input device 4 (S504). The printer selection information is read from RAM 2 (S505) and a corresponding printer driver is loaded in RAM 2 (S506).

Next, the application transmits a print command for the user generated image or character data to the printer driver. Upon reception of the print command (S507), the printer driver converts the data into print data of image data corresponding to the print command (S508).

The converted print data of image data is stored in the hard disk 3 (S509).

Next, an isochronous transmission bandwidth inquiry command is issued to the line controller 7 (S510).

Upon reception of the isochronous transmission bandwidth, the line controller 7 confirms the line condition as to an unused bandwidth of the current line (S511).

If the host computer connected to a network is a root, the bandwidth is managed by RAM 2. Therefore, in response to the inquiry about the bandwidth, it is acquired from RAM 2. If the host computer is connected in one-to-one correspondence to the printer, the host computer is automatically set to the root.

If the host computer is a leaf, an external apparatus functioning as the root manages the bandwidth. Therefore, the bandwidth is inquired to the root via the line controller 7 and network. In response to this inquiry, the bandwidth information is returned back.

In accordance with the confirmed unused isochronous data transmission bandwidth, an expected transmission rate for print data of image data is calculated and compared with a maximum value (a value specific to the printer engine) of the operation speed of the printer engine.

If the unused isochronous data transmission bandwidth is large, the bandwidth suitable for the maximum value of the printer engine operation speed is acquired for transmission of print data of image data (S516).

The maximum value of the printer engine operation speed is stored in RAM 2 in its "speed field" (S517).

If the unused isochronous data transmission bandwidth is not large, all the unused isochronous data transmission bandwidth is acquired (S513).

A printer engine operation speed is calculated so as to operate the printer engine at the acquired bandwidth (data transmission rate) (S514), and stored in RAM 2 in its "speed field" (S515).

Next, in order to notify the printer of the printer engine operation speed, the value in the "speed field" of RAM 2 is transmitted via the line controller 7 to the printer, in the format of asynchronous packet (S518).

It is checked whether the line controller 7 has received a setting end from the printer, and if not the setting end is waited for (S519). Upon reception of the setting end, the line controller informs that isochronous transmission bandwidth has been acquired (S520). In this manner, it can be judged that the printer has established a preparation for receiving the print data of image data. Therefore, a print data transmission start command is issued to the line controller (S521).

The print data is read from the hard disk and supplied to the line controller 7 (S522). The line controller 7 transmits the print data transmission start command to the printer via the line (S523). The line controller 7 starts transmitting the print data (S524) to transmit the print data of image data synchronously with the acquired isochronous transmission bandwidth (S525).

All the print data of image data is transmitted (S526). The print data of image data is transmitted in the format of isochronous packet. This format will be later described.

After all the print data of image data is transmitted (S527), the line controller 7 transmits a print data transmission end command to the printer (S528).

The acquired isochronous transmission bandwidth is released (S529).

The line controller 7 notifies the data transmission end (S530) to terminate the procedure (S531).

Next, the print operation will be described.

An initializing process is first executed to make the printer idle (S601).

The line controller 17 waits for a transmission of data from the host (S602). Upon reception of data, the contents of the data are checked to confirm the "speed" (S603). If the data is the "speed", the line controller 17 notifies of the reception of the "speed" (S604), and stores it in RAM 12

(S605). The line controller instructs the mechanical controller 19 to set the printer engine operation speed to the received "speed" (S606). Upon reception of the printer engine operation speed setting request (S607), the mechanical controller 19 acquires the current actual printer engine operation speed v from the processing speed sensor (S608). The current printer engine operation speed v is compared with the received "speed" (S609, S611, S613).

If v is larger, it is judged that the printer engine operation speed is too more than the line transmission rate, and the mechanical controller 19 decelerates the control speed of the mechanism (S610).

If v is smaller, it is judged that the printer engine operation speed is too less than the line transmission rate, and the mechanical controller 19 accelerates the control speed of the mechanism (S612).

If v is equal to the "speed", it is judged that the printer engine operation speed is equivalent to the line transmission rate, and the mechanical controller 19 notifies a setting end of the printer engine (S614).

In order to notify the host computer of the print data reception preparation completion, the line controller 17 is instructed to transmit a setting completion notice to the host computer (S615). In response to this, the line controller 17 transmits the setting completion notice to the host computer (S616).

The line controller 17 waits for data to be transmitted from the host (S617).

When the data is received, the contents of data are checked to confirm whether the received data is the print data transmission start command (S618). If so, the mechanical controller 19 is instructed to start the print process (S619). The print data processor is also instructed to start the print process (S620). The line controller 17 waits for data to be transmitted from the host (S621).

When the data is received, the contents of data are checked to confirm whether the received data is the print data (S622). If so, the received data is sent to the print data processor (S623).

The print data processor executes processes necessary for the print data (S624) and writes the processed data in the video I/F (S625). The printer engine controlled by the mechanical controller transfers the image written in the video I/F to a printing sheet to print it out (S626).

If the received data is not print data, it is checked whether the received data is the print data transmission end command (S627). If so, it is judged that the print data reception and print process have been completed, and the mechanical controller 19 is notified of the print process end (S628). The print data processor is also notified of the print process end (S629) to thereafter return to the idle state (S602).

(Sixth Embodiment)

In the fifth embodiment, the operation speed of the printer engine is controlled in accordance with the bandwidth of isochronous data transmission. The operation speed of the printer engine may be controlled in accordance with a data transmission rate. The control process thereof will be described in the following.

Similar to the isochronous transmission bandwidth of the fifth embodiment, the line controller 7 is inquired about a data transmission rate. This process is replaced by S510 to S516 of the fifth embodiment.

The printer engine operation speed is calculated from the data transmission rate. This process is replaced by S517. The processes to follow are the same as those of the fifth embodiment.

If IEEE 1394 is used as a line, the data transmission rates are only three rates of 100/200/400 bps. The printer engine operation speed corresponding to each transmission rate is stored in a table. With reference to this table, the printer engine operation speed is changed with the transmission rate.

If lines (RS232C, ISDN, ECP mode communications and the like) whose data transmission rate rarely changes unless the data transmission is intentionally stopped or decelerated by transmission and reception apparatuses after a session therebetween is established, an actual data transmission rate is measured before print data is transmitted, by transmitting dummy transmission rate measuring data to the printer.

(Seventh Embodiment)

In the fifth embodiment, the host computer acquires the bandwidth, and in accordance with this bandwidth, the printer engine operation speed is calculated and informed to the printer. Instead, the printer engine operation speed may be calculated on the side of the printer.

The host computer first acquires the bandwidth and notifies the printer of this bandwidth. The printer calculates the printer engine operation speed in accordance with the bandwidth notified from the host computer.

The mechanical controller 19 controls the printer engine operation speed in accordance with the calculated operation speed.

In this case, the steps S514 and S515 of the fifth embodiment are executed by the printer. At S518, not the "speed" but the isochronous data transmission bandwidth is transmitted.

This embodiment can be applied not only to the case where the printer engine operation speed is calculated from the isochronous data transmission bandwidth but also to the case of the sixth embodiment wherein the printer engine operation speed is calculated from the data transmission rate.

Figure 18:
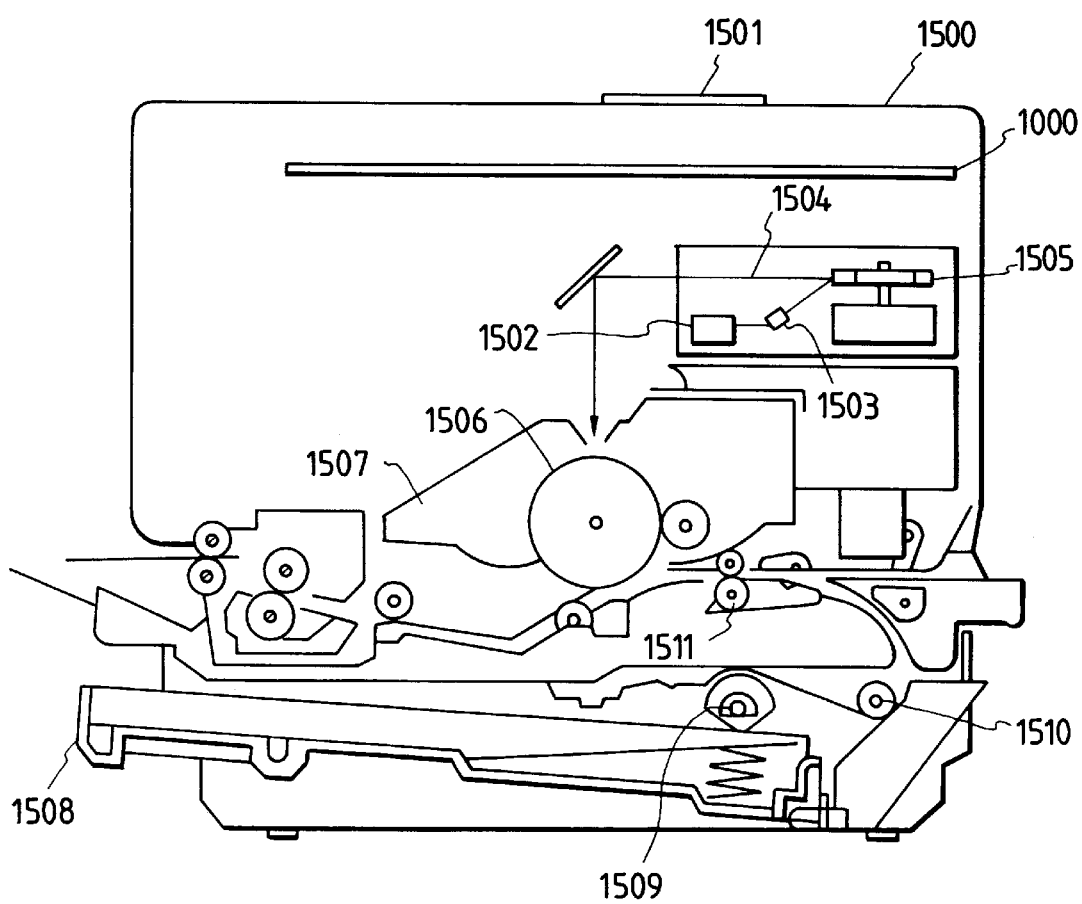
FIG. 18 is a schematic diagram showing the structure of a laser beam printer applicable to the present invention.
Figure 19:
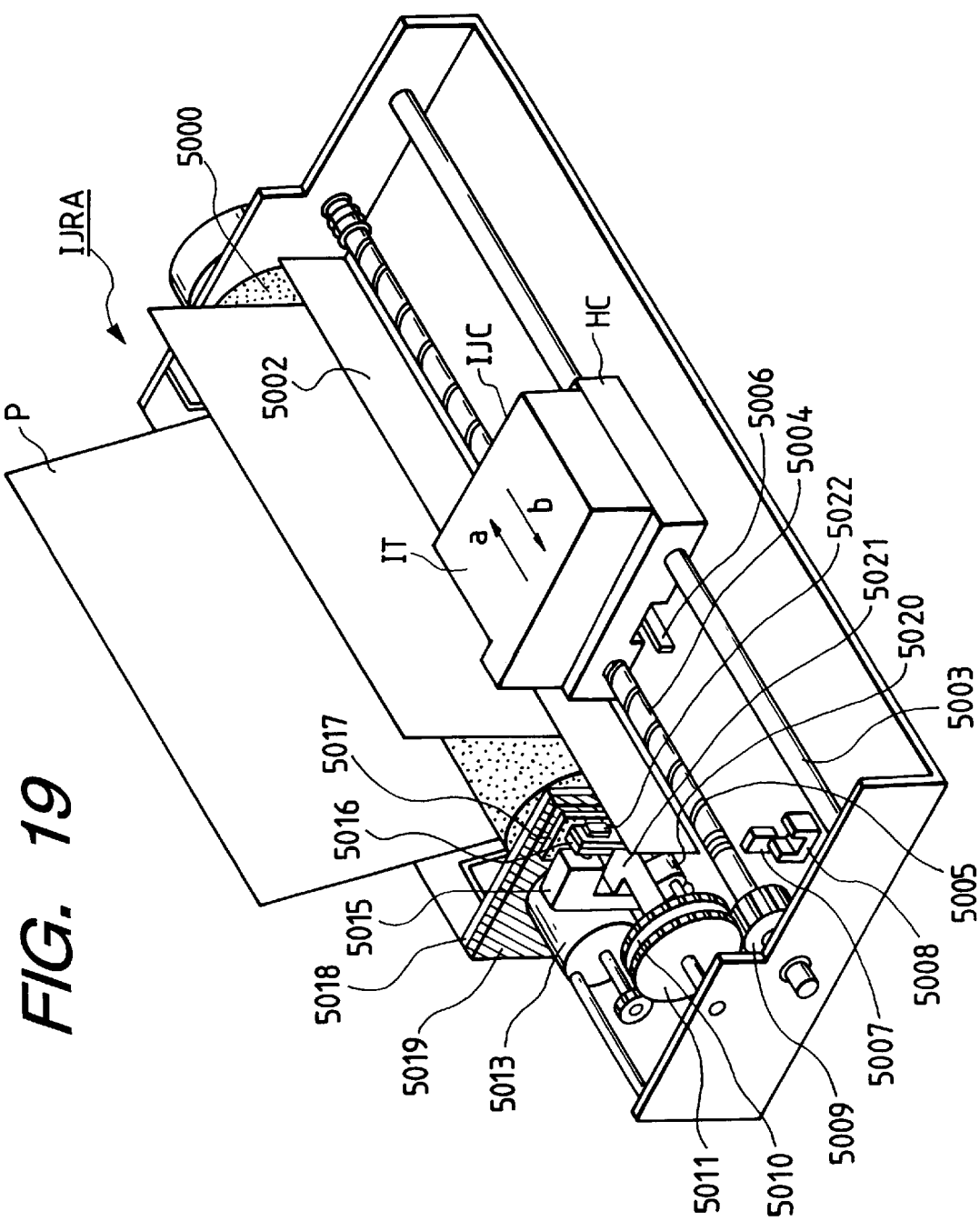
FIG. 19 is a schematic diagram showing the structure of an ink jet printer applicable to the present invention.

Examples of the printer engine shown in FIGS. 1 to 4 and 15 are shown in FIGS. 18 and 19. A printer to be applied to the invention embodiments is not limited to a laser beam printer and an ink jet printer, but other printers of different types may also be used obviously.

FIG. 18 is a schematic cross sectional view of a first output apparatus applicable to the invention, e.g., a laser beam printer (LBP).

Referring to FIG. 18, reference numeral 1500 represents an LBP which stores print information (character codes and the like), form information, macro instructions and the like supplied from an externally connected host computer, and in accordance with stored information, generates corresponding character patterns, form patterns and the like to print an image on a recording medium such as a recording sheet. Reference numeral 1501 represents an operation panel mounted with switches, LED display units and the like for the operation of LBP. Reference numeral 1000 represents a print control unit for controlling LBP 1500 and analyzing character information and the like supplied from the host computer. This print control unit 1000 converts mainly character information into video signals of character patterns and outputs them to a laser driver 1502. The laser driver 1502 drives a semiconductor laser 1503 to turn on and off a laser beam 1504 radiated from the semiconductor laser 1503, in accordance with input video signals. The laser beam 1504 is moved right and left by a rotary polygon mirror 1505 to scan and expose the surface of an electrostatic drum 1506 so that an electrostatic latent image of a character pattern can be formed on the electrostatic drum 1506. This latent image is developed by a developing unit disposed around the periphery of the electrostatic drum 1506 and thereafter transferred to a recording sheet. As recording sheets, cut sheets are used and accommodated in the paper cassette

1508 mounted on LBP 1500. Each cut sheet is introduced into the LBP by paper feed rollers 1509, transport rollers 1510 and 1511 and fed onto the electrostatic drum 1506. LBP 1500 has at least one unrepresented card slot so that an option font card in addition to the built-in font data or a different language control card (emulation card) can be connected.

FIG. 19 is a perspective view of a second output apparatus applicable to the invention, e.g., an ink jet recording apparatus (IJRA).

Referring to FIG. 19, a carriage HC engages with a spiral groove 5004 of a lead screw 5005 which is rotated by drive force transmission gears 5011 and 5009 in association with the normal or reverse rotation of a drive motor 5013. The carriage HC has unrepresented pins and is moved reciprocally in arrow a and b directions. An ink jet cartridge IJC is mounted on this carriage HC. Reference numeral 5002 represents a paper pusher plate which pushes a recording sheet against a platen 5000 over the whole span of carriage motion. Reference numerals 5007 and 5008 represent photocouplers for detecting a presence of a carriage lever 5006 in this area and functioning as a home position detecting means used for switching rotation directions of the motor 5013 or for other operations. Reference numeral 5016 represents a support for supporting a cap member 5022 which caps the whole surface of a recording head. Reference numeral 5015 represents a suction means for sucking the inside of the cap member to perform suction recovery of the recording head via an opening 5023 in the cap member. Reference numeral 5017 represents a cleaning blade which is made movable back and forth with a member 5019. Reference numeral 5018 represents a support plate for supporting the blade 5017 and member 5019. Reference numeral 5012 represents a lever for initiating suction of the suction recovery, the lever being made movable by a cam 5020 engaging with the carriage so that a drive force of the drive motor is controlled by a know transmission means such as a clutch.

These capping, cleaning and suction recovery are performed by the function of the lead screw 5005 at respective positions and at proper timings when the carriage comes to the home position side.

Figure 25:
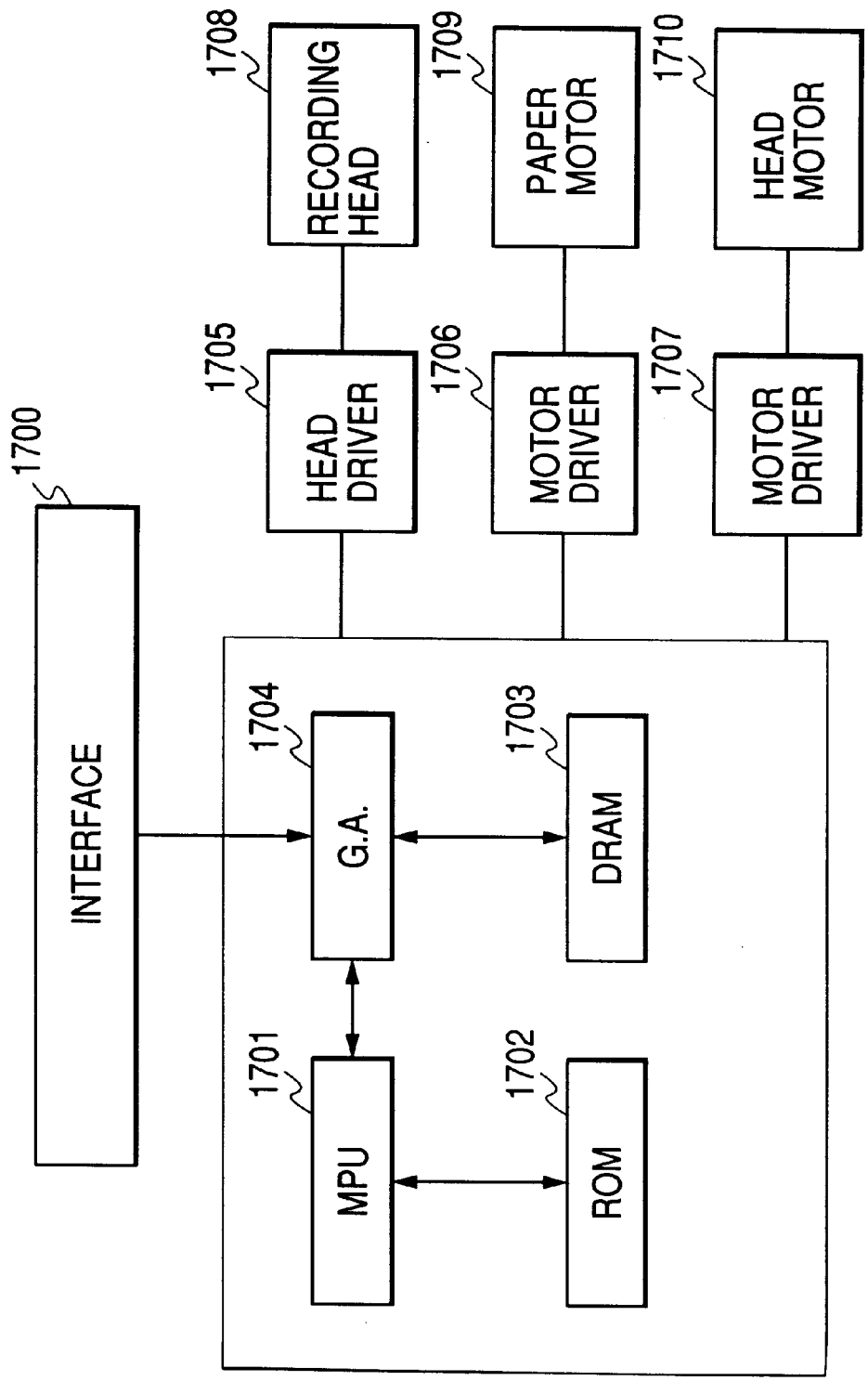
FIG. 25 is a diagram showing the control structure of the ink jet printer shown in FIG. 19.

FIG. 25 is a block diagram illustrating a control function of the second output apparatus shown in FIG. 19.

Referring to FIG. 25, reference numeral 1700 represents an interface for inputting a record signal supplied from a host computer. Reference numeral 1701 represents an MPU, 1702 represents a ROM for storing control programs to be executed by MPU 1701 and host print information or the like, and 1703 represents a DRAM for storing various data such as the above-described record signal, and record data to be supplied to the head. Reference numeral 1704 represents a gate array for performing a control of supplying data to a recording head 1708, and also for data transmission control among the interface 1700, MPU 1701 and DRAM 1703. Reference numeral 1710 represents a carrier motor for transporting the recording head 1708, 1709 represents a transport motor for transporting a recording sheet, 1705 represents a head driver for driving the recording head, 1706 represents a motor driver for driving the transport motor 1709, and 1707 represents a motor driver for driving the carrier motor 1710.

In the recording apparatus constructed as above, when data is input from a host computer via the interface 1700, the input data is converted into print data by the gate array 1704 and MPU 1701. As the motor drivers 1706 and 1707 are driven, the print data supplied to the head driver 1705 drives the recording head to print it out.

In the present invention, since IEEE 1394 serial busses are used for interconnection of respective apparatuses, an IEEE 1394 serial bus will be described. (Outline of IEEE 1394 Technique) With the advent of home digital VTR and DVD, it becomes necessary to support real time data transmission of a large amount of video and audio data. In order to transmit such video and audio data in real time to a digital apparatus or a personal computer (PC), it is necessary to provide an interface having necessary transmission functions and high speed data transmission ability. An interface developed from this viewpoint is IEEE 1394-1995 (High Performance Serial Bus)(hereinafter simply called 1394 serial bus).

Figure 20:
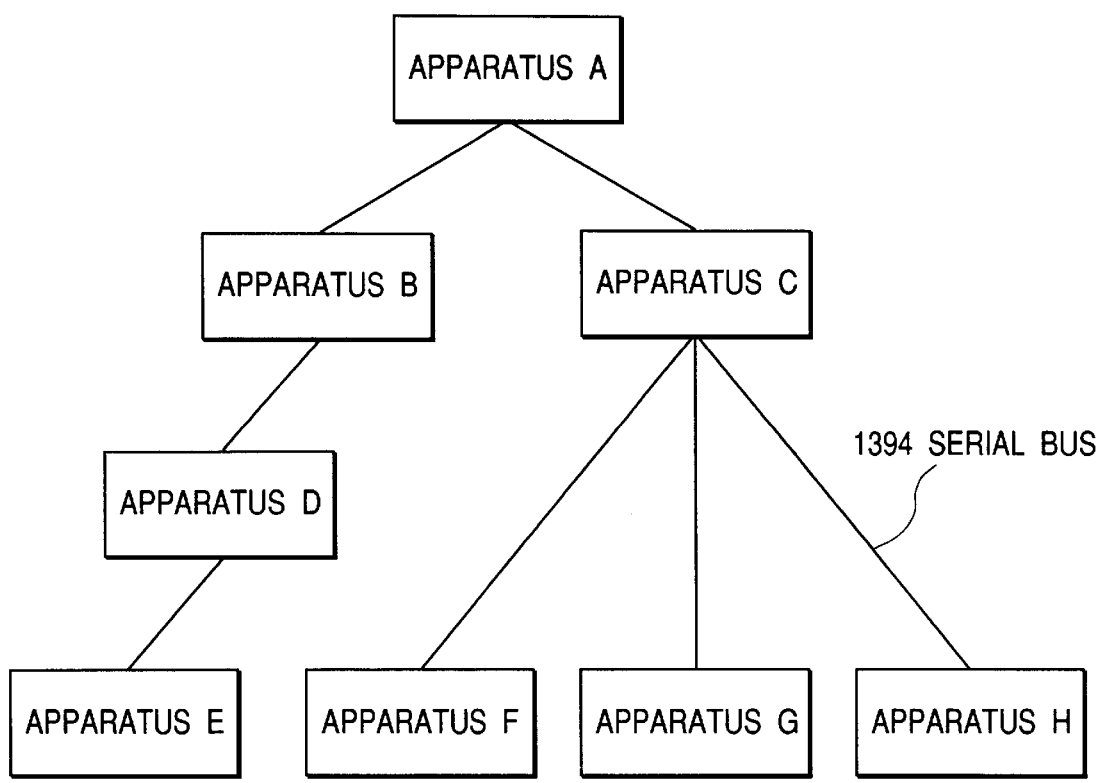
FIG. 20 shows an example of a network system using IEEE 1394 serial busses.

FIG. 20 shows an example of a network system configured by using 1394 serial busses. This system has apparatuses A to H. Twist pair cables of 1394 serial bus are connected between A and B, between A and C, between B and D, between D and E, between C and F, between C and G and between C and H. Examples of these apparatuses are a PC, a digital VTR, a DVD, a digital camera, a hard disk, a monitor and the like.

As the interconnection method for these apparatuses, daisy chain and node branch are both used so that a high degree of connection freedom is possible.

Each apparatus has its specific ID, and the apparatuses connected by 1394 serial busses confirm each ID to establish one network. The apparatuses are sequentially connected by 1394 serial bus cables, and each apparatus servers as a relay station among the apparatuses to configure a single network. When each apparatus is connected by a 1394 serial bus, it can be automatically recognized and the connection state thereof can be recognized with the help of the Plug and Play function characteristic to the 1394 serial bus.

The data transmission rates include 100/200/400 bps. The apparatus having a higher transmission rate supports the apparatus having a lower transmission rate to make them compatible.

The data transmission mode includes an asynchronous transmission mode for transmitting asynchronous data (hereinafter called Async data) such as control signals and an isochronous transmission mode for transmitting isochronous data (hereinafter called Iso data) such as real time video and audio data. The Iso data is transmitted with a priority over the Async data in each cycle (generally 125 $\mu$s), after a cycle start packet (CSP) indicating the start of a cycle is transmitted.

Figure 21:
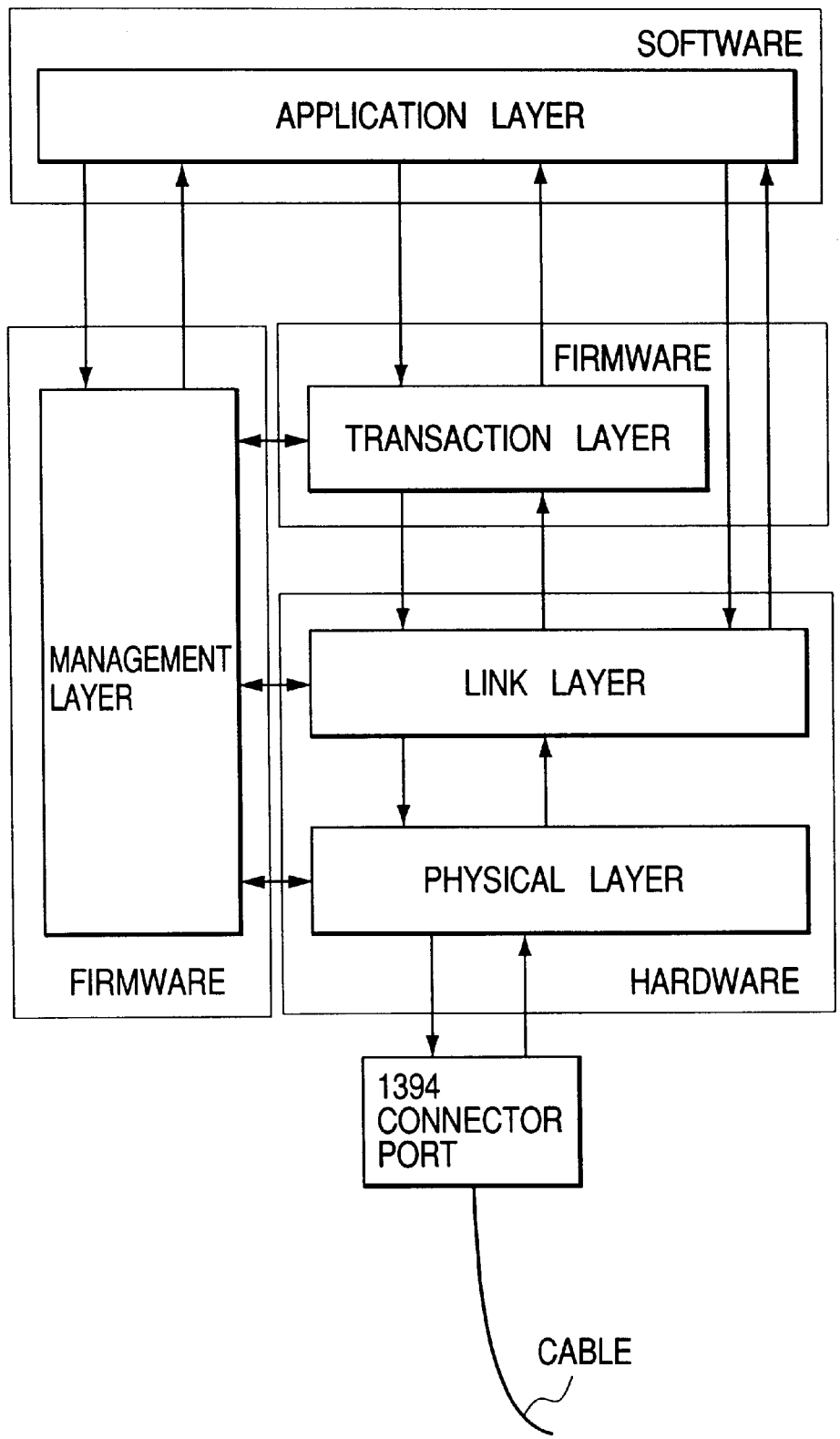
FIG. 21 is a diagram showing constituents of an IEEE 1394 serial bus.

The constituents of the 1394 serial bus are shown in FIG. 21.

The 1394 serial bus is configured to have a layer (hierarchical) structure. As shown in FIG. 21, the constituent most like hardware is the 1394 serial bus cable which is connected to a 1394 connector port on which a physical layer and a link layer are formed as hardware.

The hardware portion is substantially an interface chip. Of the hardware portion, the physical layer performs coding and connector control, and the link layer performs packet transmission and cycle time control.

A transaction layer of a firmware portion performs management of data to be transmitted (transacted) and generates commands such as Read and Write commands. A management layer performs the management of connection state and ID of each apparatus connected to the system to thereby manage the network configuration.

These hardware and software are the substantial structure of the 1394 serial bus.

An application layer of the software portion becomes different depending upon software to be used. This layer defines how data is placed on an interface, in accordance with a protocol such as an AV protocol.

The structure of the 1394 serial bus has been described above.

Figure 22:
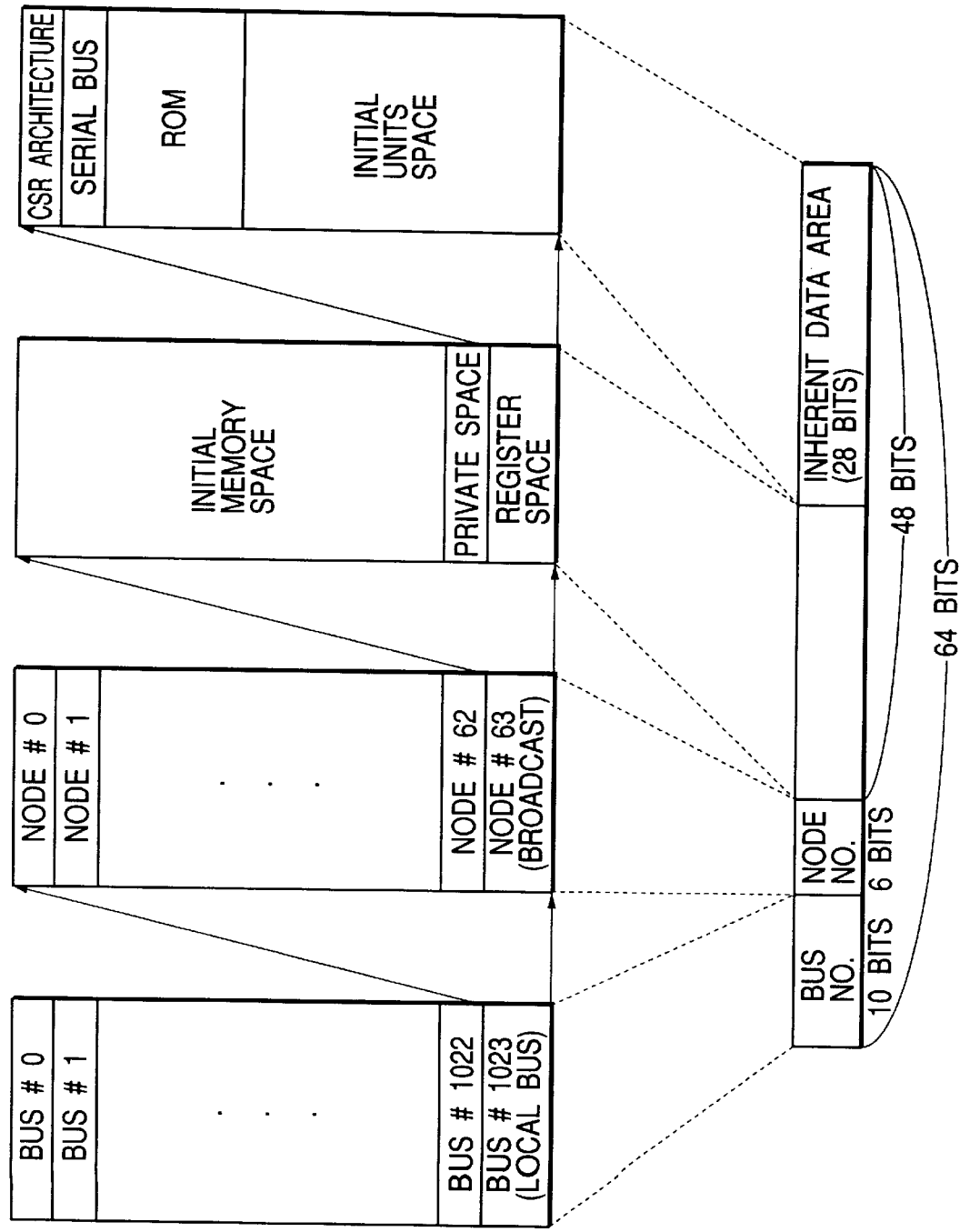
FIG. 22 is a diagram showing the address space of an IEEE 1394 serial bus.

FIG. 22 shows an address space of the 1394 serial bus.

It is essential to make each apparatus (node) connected to the 1394 serial bus have a 64-bit address specific to its node. This address is stored in ROM so that the node address of its own or a partner node can be recognized always to allow communications with a designated partner.

Addressing of the 1394 serial bus incorporates a scheme in conformity with IEEE 1212 specifications. In addressing, the first 10 bits are used for designating a bus number, and the next 6 bits are used for designating the node ID. The remaining 48 bits form an address width assigned to the apparatus and can be used as a specific address space. The last 28 bits are used as a specific data area in which information of apparatus discrimination and use condition designation is stored.

The outline of the 1394 serial bus technique has been given above.

Figure 23:
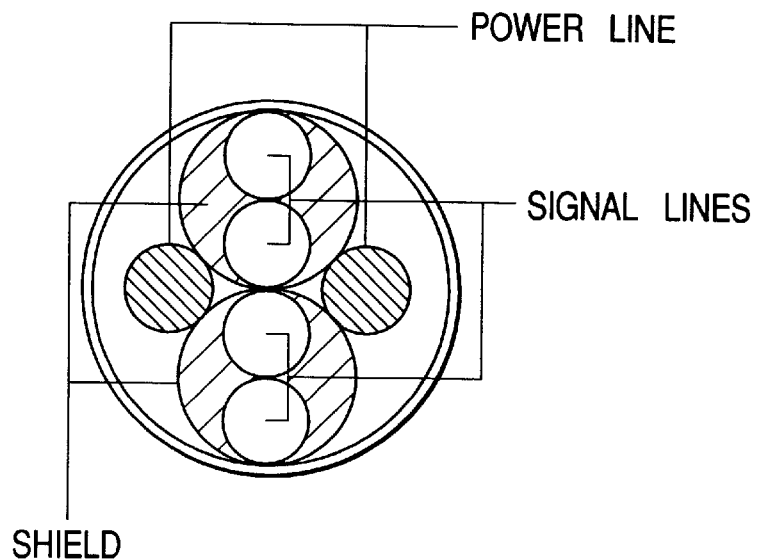
FIG. 23 is a cross sectional view of a serial bus cable.

Next, the techniques characteristic to the 1394 serial bus will be described in more detail. (Electrical Specifications of 1394 Serial Bus) FIG. 23 is a cross sectional view of a 1394 serial bus cable.

The 1394 serial bus cable has power lines in addition to two pairs of twist pair signal lines. Therefore, an apparatus without a power source or an apparatus with a lowered power supply voltage by some trouble can be supplied with power via the power lines.

It is stipulated that a power supply voltage at the power line is 8 to 40 V, and a current is DC 1.5 A at a maximum. (DS-Link Coding)

Figure 24:
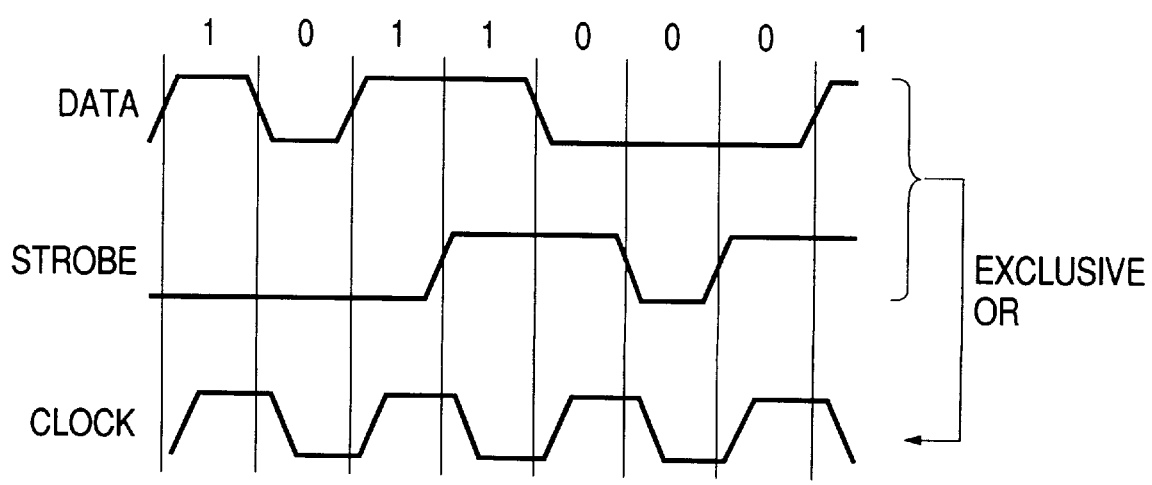
FIG. 24 is a diagram illustrating a DS-Link coding scheme.

FIG. 24 illustrates a DS-Link (Data/Strobe Link) coding scheme for a data transmission format adopted by the 1394 serial bus.

The 1394 serial bus adopts the DS-Link coding scheme. This DS-Link coding scheme is suitable for high speed serial data communications. It is necessary to use two pairs of signal lines. One pair of two twist pair signal lines is used for transmitting main data, and the other of two twist pair signal lines is used for transmitting a strobe signal.

On the reception side, a clock can be retrieved by an exclusive logical sum of the transmitted data and strobe.

The merits of the DS-Link coding scheme are as follows. A transmission efficiency is higher than other serial data transmission methods. Since a PLL circuit is not necessary, the scale of a controller LSI can be made small. Since it is not necessary to transmit information representative of an idle state when there is no data to be transmitted, a transceiver circuit of each equipment can enter a sleep state and a power consumption can be lowered.
(Asynchronous Transmission)

Figure 26:
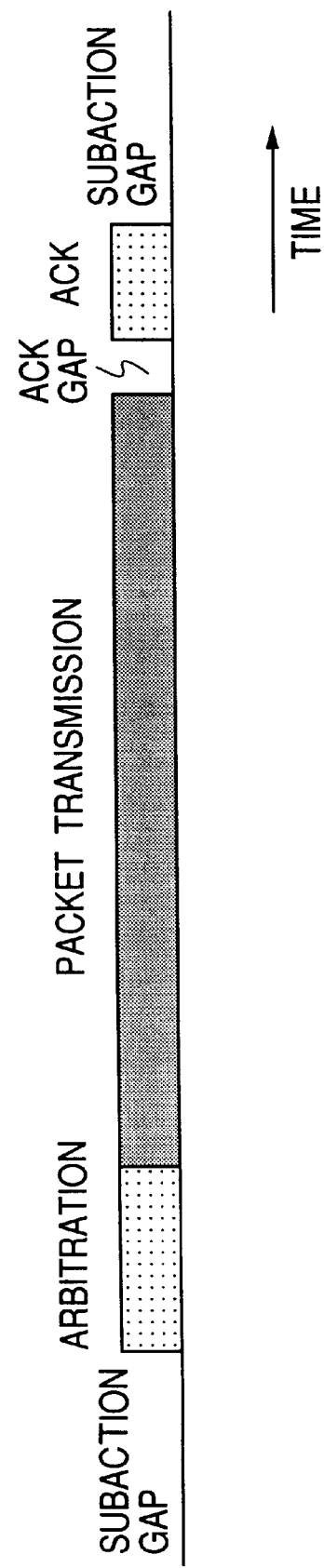
FIG. 26 is a diagram showing a time sequential transition state during asynchronous transmission.

The asynchronous transmission transmits data asynchronously. FIG. 26 shows a time sequential transition during the asynchronous transmission. The first subaction gap shown in FIG. 26 indicates an idle state of the bus. When this idle time reaches a constant value, the node intending to transmit data judges that the bus can be used, and executes an arbitration for acquiring the bus.

If a use permission is obtained by the arbitration, the data in a packet format is transmitted. After the data transmission, the node received the data returns back an ack (reception confirmation return code) after a short ack gap, or returns a response packet to complete the data transmission. The ack is constituted of four-bit information and four-bit check sums including information of a success, failure, or pending state, and is returned immediately to the transmission source node.

Figure 27:
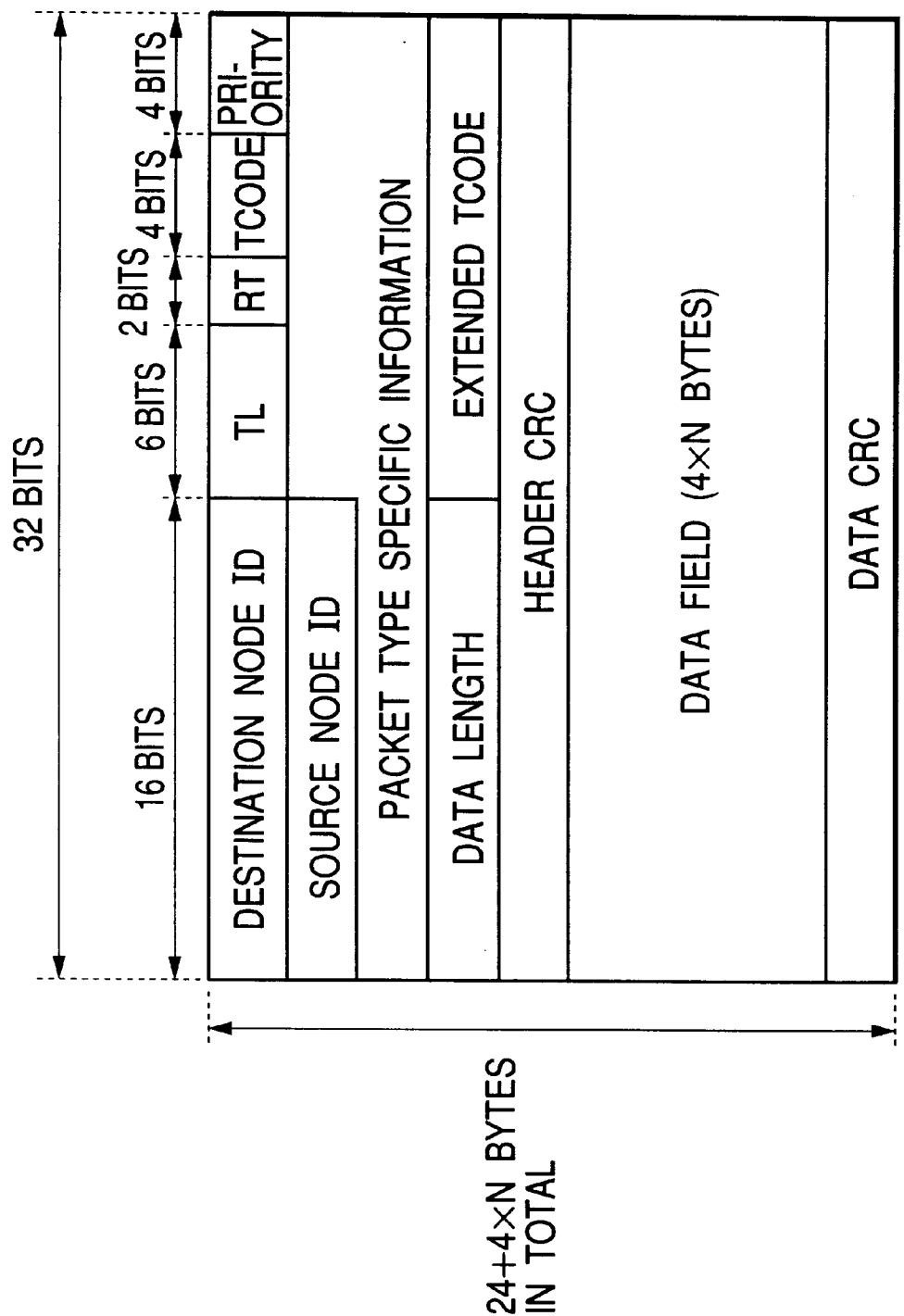
FIG. 27 shows an example of a packet format used by asynchronous transmission.

FIG. 27 shows an example of the packet format used by the asynchronous transmission.

The packet includes a header field in addition to a data field and error correction data CRC. The header field is written with, as shown in FIG. 27, an object node ID, a source node ID, a transmission data length, and various codes to transmit them.

The asynchronous transmission is one-to-one communications between its own node and a partner node. A packet transmitted from the transmission source node is transmitted to each node of the network. However, the packet transmitted to each node and not having an address of the node is discarded, so that only one node having the object node address can read the packet.
(Isochronous Transmission)

The isochronous transmission transmits data synchronously. The most characteristic feature of the 1394 serial bus is this isochronous transmission. This mode is suitable particularly for real time data transmission required for multi media data such as video and audio data.

Although the asynchronous transmission is one-to-one transmission, this isochronous transmission can broadcast a packet from one transmission source to all other nodes, by using the broadcast function.

Figure 28:
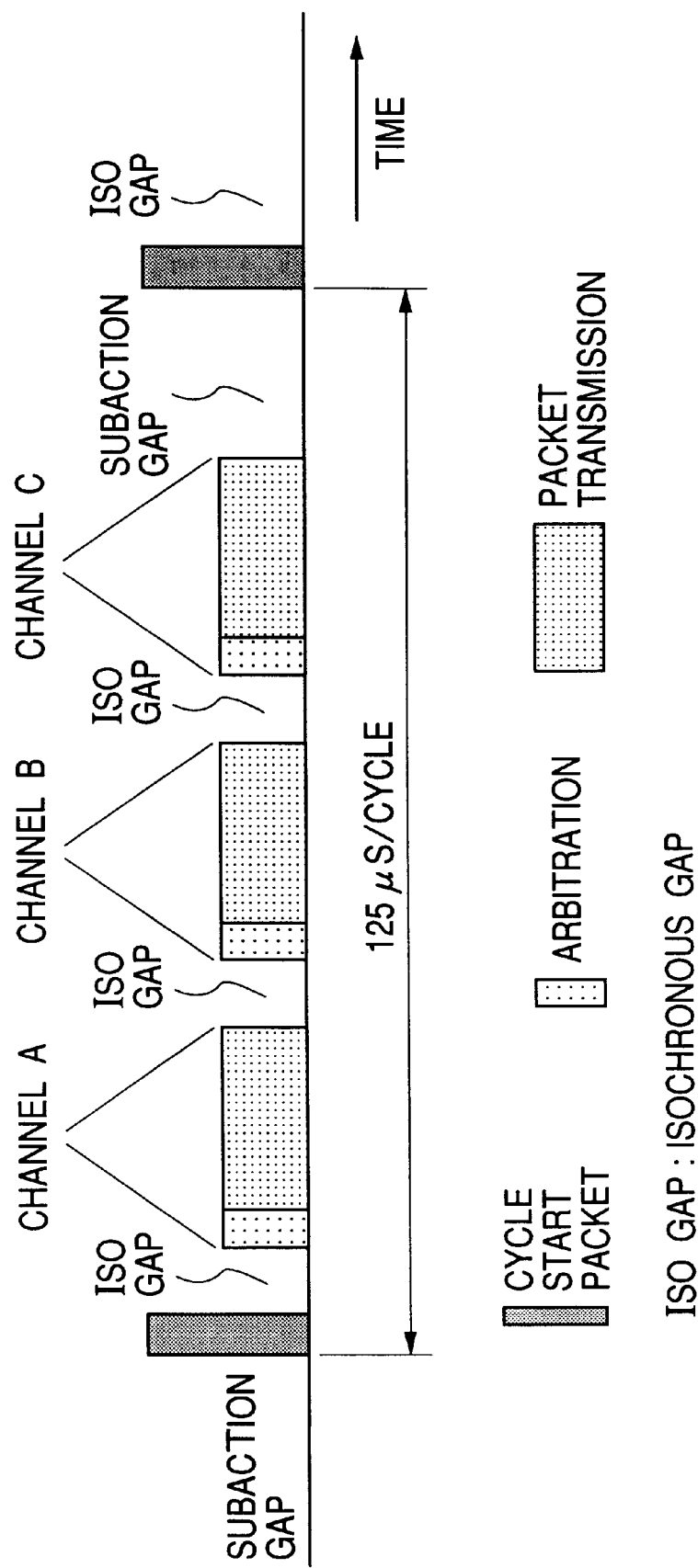
FIG. 28 is a diagram showing a time sequential transition state during isochronous transmission.

FIG. 28 shows a time sequential transition during the asynchronous transmission.

The isochronous transmission is executed on the bus at a predetermined time interval. This time interval is called an isochronous cycle which is 125 μs. A cycle start packet shows a start time of each cycle and has a roll of adjusting time at each node. The cycle start packet is transmitted by a node called a cycle master. The cycle start packet indicating the start of a cycle is transmitted after a predetermined idle period (subaction gap) after the transmission in the preceding cycle is completed. The cycle start packet is transmitted at a time interval of 125 μs.

A plurality of packets in channels A, B and C such as shown in FIG. 28 can be transmitted during one cycle in a discriminated manner by assigning each packet with a channel ID. It is therefore possible to transmit a plurality of packets to a plurality of nodes in real time and to receive the data having only a desired channel ID. This channel ID does not indicate the object node address, but it is only a logical number of data. Therefore, each packet is transmitted from one source node to all other nodes, i.e., the packet is broadcast.

Prior to transmitting a packet through isochronous transmission, arbitration is performed similar to the asynchronous transmission. Since the isochronous transmission is not one-to-one communications like the asynchronous transmission, the ack (reception confirmation return code) is not used for the isochronous transmission.

An iso gap (isochronous gap) shown in FIG. 28 is an idle period necessary for confirming before the isochronous transmission that the bus is idle. After this predetermined idle period lapses, a node intending to perform isochronous transmission judges that the bus is idle and can perform arbitration before the transmission.

Figure 29:
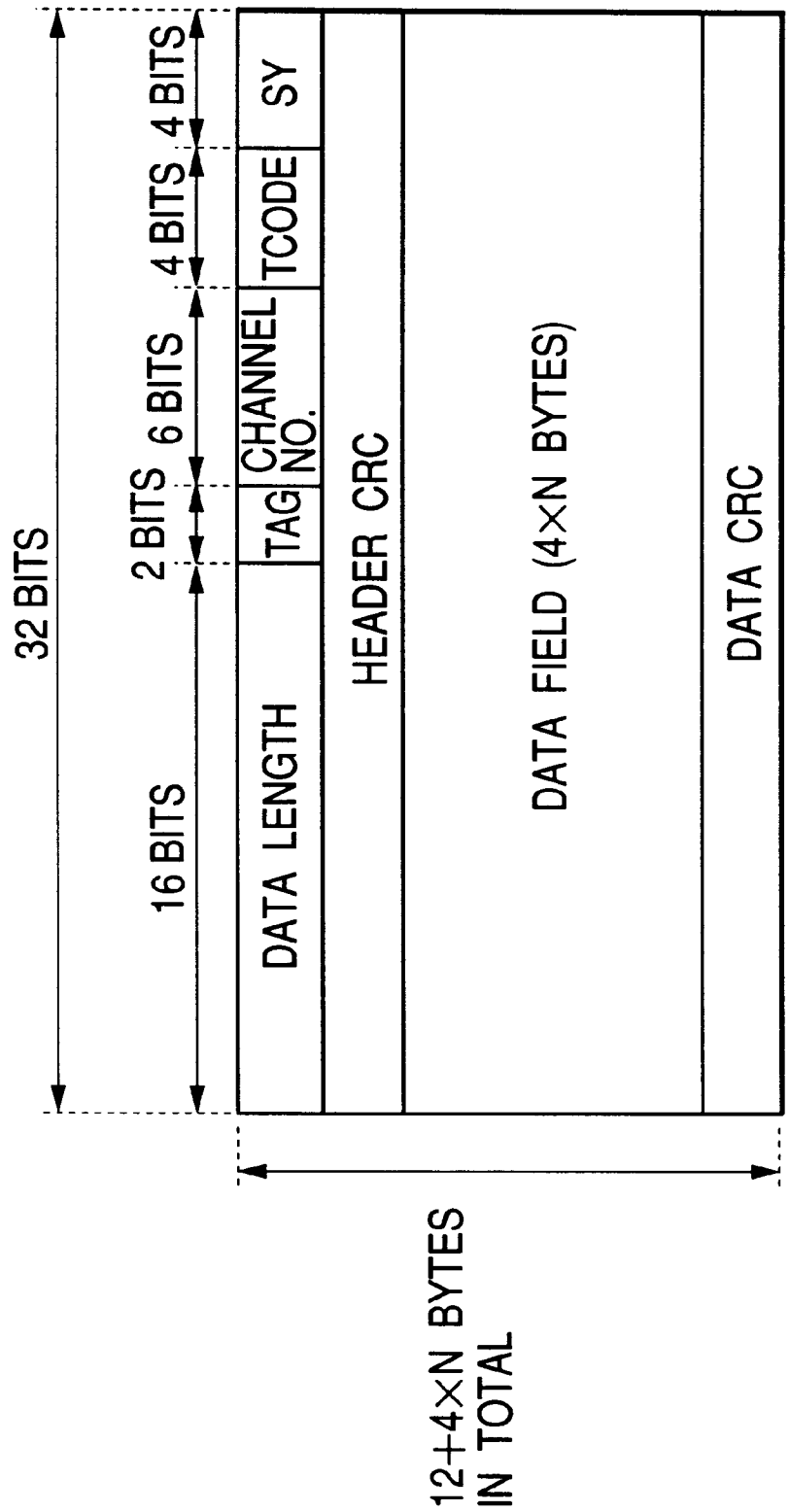
FIG. 29 shows an example of a packet format used by isochronous transmission.

FIG. 29 shows an example of the format of a packet used by the isochronous transmission.

Each packet in each channel includes a header field in addition to a data field and error correction data CRC. The header field is written with, as shown in FIG. 29, a transmission data length, a channel number, various other codes, and an error correction header CRC to transmit them.

The isochronous transmission has been described above.

(Bus Cycle)

Figure 30:
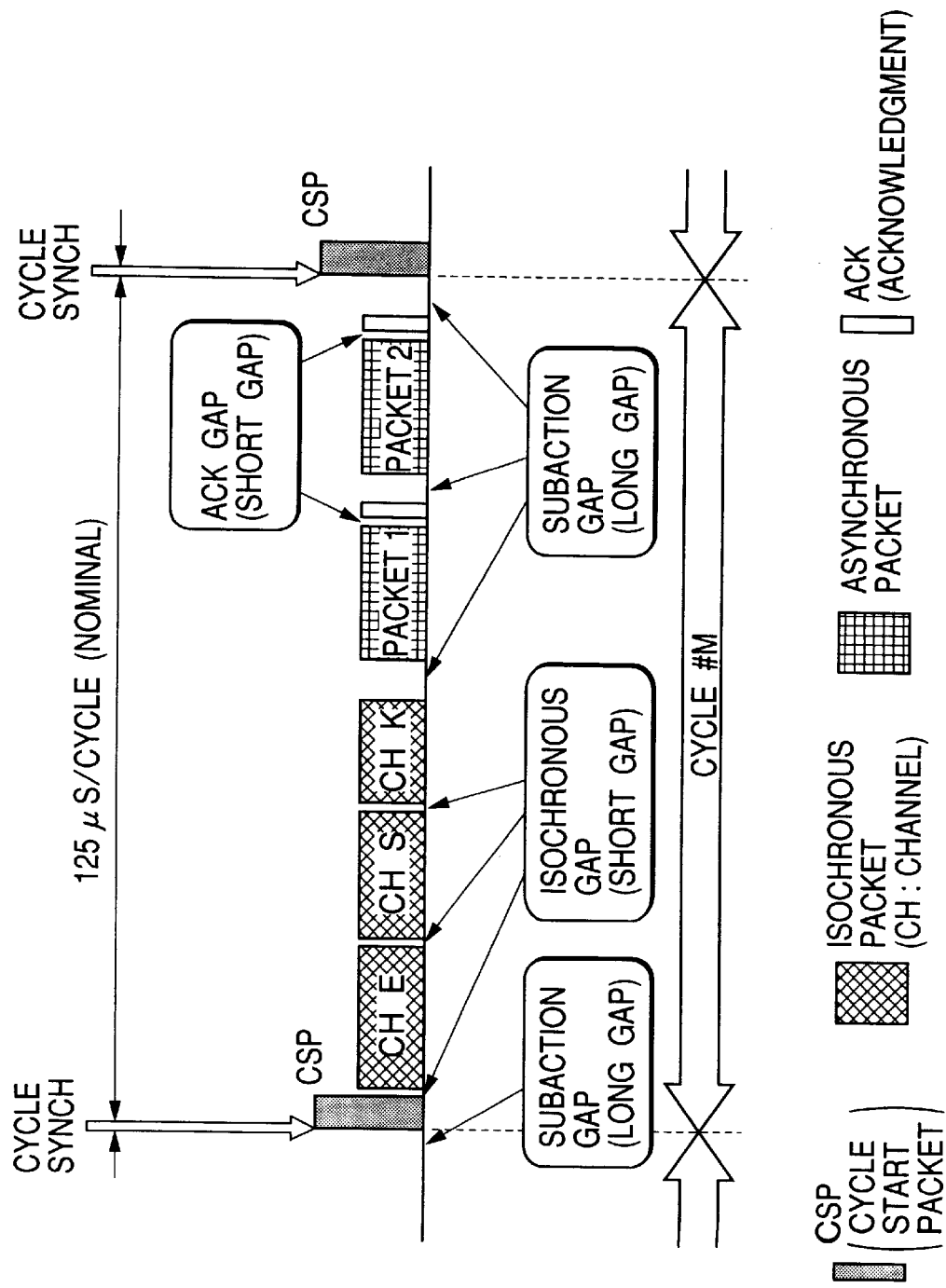
FIG. 30 shows a time sequential transition state of busses using both isochronous and asynchronous transmissions.

Both the isochronous and asynchronous transmissions can be performed on the 1394 serial bus. FIG. 30 shows a time sequential transition of both the isochronous and asynchronous transmissions on the bus.

The isochronous transmission is performed with a priority over the asynchronous transmission. The reason for this is that the isochronous transmission can be performed after the cycle start packet, with a shorter gap length (isochronous gap) than a gap length (subaction gap) of the idle period necessary for performing the asynchronous transmission. The isochronous transmission is therefore performed with a priority over the asynchronous transmission.

In a general bus cycle shown in FIG. 30, at the start of the cycle #m, a cycle start packet is transmitted from the cycle master to each node. Each node performs time adjustment. After the predetermined idle period (isochronous gap), a node intending to perform isochronous transmission carries out arbitration to transmit a packet. In the example shown in FIG. 30, a channel e, a channel s and a channel k are used in this order for the isochronous transmission.

After the operations of the arbitration and packet transmission are repeated a given number of channels and all the isochronous transmissions in the cycle #m are completed, the asynchronous transmission becomes possible.

When the idle time lapses corresponding to the subaction gap necessary for the asynchronous transmission, a node intending to perform the asynchronous transmission judges that arbitration can be performed.

The period while the asynchronous transmission can be performed, is limited only when the subaction gap for the asynchronous transmission is obtained until the cycle synch time for transmitting the next cycle start packet.

In the cycle #m shown in FIG. 30, the isochronous transmissions for three channels are performed and thereafter the asynchronous transmissions (including ack) for two packets (packets 1 and 2) are performed. After the asynchronous packet 2, it is the time (cycle synch) when the cycle (m+1) starts so that the transmission in the cycle #m terminates at this time.

If it becomes the time (cycle synch) for transmitting the next cycle start packet, during the operation of asynchronous or isochronous transmission, this operation is not stopped forcibly but after the idle time after this transmission, the next cycle start packet is transmitted. Namely, if the one cycle continues longer than 125 $\mu$s, the next cycle is made shorter than 125 $\mu$s correspondingly. In this manner, the cycle time can be elongated or shortened relative to 125 $\mu$s.

The isochronous transmission is always executed in each cycle, if necessary, in order to preserve the real time transmission, whereas the asynchronous transmission may be passed to the next or following cycle if the cycle time is shortened.

With the above arrangement, the data transmission rate can be made optimum in accordance with the line capacity. According to the first to third embodiments, if a line having a high transmission rate is used, the host computer generates data so as to minimize data conversion at the printer. Although the data amount increases, it takes not so long a time to transmit data because the line is high speed, and a load of a data conversion process at the printer is reduced. It is therefore possible for a user to obtain a printed sheet in a short time.

If the line is low speed, the host computer generates print data so as to reduce the amount of data even if a load of the data conversion process at the printer increases. Accordingly, the data transmission time is shortened, and the total process time is shortened even if the analysis process takes a time, because the printer has a relatively high process time.

In the fourth embodiment, a load distribution is controlled in accordance with the bandwidth of isochronous transmission.

If the bandwidth of isochronous transmission is large, it takes not so long a time to transmit data. Therefore, if a conversion method with a large data transmission amount is adopted, a load of the data conversion process at the printer can be reduced. It is therefore possible for a user to obtain a printed sheet in a short time.

If the bandwidth of isochronous transmission is small, it takes a long time to transmit data. Therefore, if a conversion method with a small data transmission amount is adopted, printing can be performed without overrun.

Similar advantageous effects can also be obtained also for the case where the load distribution is controlled in accordance with the data transmission rate.

With the fifth to seventh embodiments, the processing capacity of a printer and a line transmission capacity are adjusted properly. The line transmission capacity corresponds to the isochronous transmission bandwidth in the case of the fifth embodiment, and to the data transmission rate in the case of the sixth embodiment.

If the processing capacity of a printer is lower than the data transmission capacity, the line isochronous transmission bandwidth is acquired as small as possible to match the print operation speed, so that the bandwidth is not acquired unnecessarily large. Adverse effects on other communications on the same line can therefore be minimized.

Since the reception data amount per unit time at a printer is balanced with a print data amount, it is not necessary to buffer the received print data. The printer is not therefore required to have many memories.

If the processing capacity of a printer is higher than the data transmission capacity, all the isochronous transmission bandwidth which can be acquired is used for the data transmission. The use efficiency of the isochronous transmission line resource becomes very high. A user can therefore obtain a printed sheet or the like in a shortest time. If the print process is performed at the highest operation speed of the printer, the data transmission lags behind the print operation and overrun occurs. In order to avoid this, the print operation speed is controlled in accordance with the data transmission rate. It is therefore possible to print data at a most proper speed in an allowable range of the processing capacity of a printer and the data transmission rate.

What is claimed is:

1. An information processing apparatus connected to a printer via a connector, said apparatus comprising:

a receiver, arranged to receive a print instruction from an application;

a determination unit, arranged to determine a rasterization level based on the connector; and a transmitter, wherein, if said determination unit determines the rasterization level to be a first rasterization level, said transmitter converts the print instruction received by said receiver into image data and transmits the image data to the printer, and, if said determination unit determines the rasterization level to be a second rasterization level, said transmitter converts the print instruction received by said receiver into print data, to be converted into image data by the printer, and transmits the print data to the printer.

2. An apparatus according to claim 1, wherein said determination unit determines the rasterization level based on a type of the connector.

3. An apparatus according to claim 1, wherein the connector functions at a data transmission speed and said determination unit determines the rasterization level based on the data transmission speed of the connector.

4. An apparatus according to claim 1, wherein the connector operates within a band width and said determination unit determines the rasterization level based on the band width of the connector.

5. An apparatus according to claim 1, wherein said determination unit determines the rasterization level based on the connector and the printer.

6. An apparatus according to claim 1, wherein said determination unit determines the rasterization level based on a table.

7. An apparatus according to claim 1, wherein, if said determination unit determines the rasterization level to be a third rasterization level, said transmitter converts the print instruction received by said receiver into image data and print data, to be converted into image data by the printer, and transmits the image data and the print data to the printer.

8. An information processing method of an information processing apparatus connected to a printer via a connector, said method comprising:

a reception step of receiving a print instruction from an application;

a determination step of determining a rasterization level based on the connector; and a transmission step, wherein, if said determination step determines the rasterization level to be a first rasterization level, said transmission step includes converting the print instruction received in said reception step into image data and transmitting the image data to the printer, and, if said determination step determines the rasterization level to be a second rasterization level, said transmission step includes converting the print instruction received in said reception step into print data to be converted into image data by the printer, and transmitting the print data to the printer.

9. A method according to claim 8, wherein said determination step determines the rasterization level based on a type of the connector.

10. A method according to claim 8, wherein the connector functions at a data transmission speed and said determination step determines the rasterization level based on the data transmission speed of the connector.

11. A method according to claim 8, wherein the connector operates within a band width and said determination step determines the rasterization level based on the band width of the connector.

12. A method according to claim 8, wherein said determination step determines the rasterization level based on the connector and the printer.

13. A method according to claim 8, wherein said determination step determines the rasterization level based on a table.

14. A method according to claim 8, wherein, if said determination step determines the rasterization level to be a third rasterization level, said transmission step includes converting the print instruction received in said reception step into image data and print data, to be converted into image data by the printer, and transmitting the image data and the print data to the printer.

15. A computer-readable storage medium storing a computer program for implementing an information processing method of an information processing apparatus that is connected to a printer via a connector, the program comprising:

program code of a reception step of causing a print instruction to be received from an application;

program code of a determination step of determining a rasterization level based on the connector; and program code of a transmission step, wherein, if the determination step determines the rasterization level to be a first rasterization level, the transmission step includes converting the print instruction received in the reception step into image data and transmitting the image data to the printer, and, if the determination step determines the rasterization level to be a second rasterization level, the transmission step includes converting the print instruction received in the reception step into print data, to be converted into image data by the printer, and transmitting the print data to the printer.

16. A storage medium according to claim 15, wherein the determination step determines the rasterization level based on a type of the connector.

17. A storage medium according to claim 15, wherein the connector functions at a data transmission speed and the determination step determines the rasterization level based on the data transmission speed of the connector.

18. A storage medium according to claim 15, wherein the connector operates within a band width and the determination step determines the rasterization level based on the band width of the connector.

19. A storage medium according to claim 15, wherein the determination step determines the rasterization level based on the connector and the printer.

20. A storage medium according to claim 15, wherein the determination step determines the rasterization level based on a table.

21. A storage medium according to claim 15, wherein, if the determination step determines the rasterization level to be a third rasterization level, the transmission step includes converting the print instruction received in the reception step into image data and print data, to be converted into image data by the printer, and transmitting the image data and the print data to the printer.

22. A computer program product embodying a computer program for implementing an information processing method of an information processing apparatus connected to a printer via a connector, the program comprising:

program code of a reception step of causing a print instruction to be received from an application;

program code of a determination step of determining a rasterization level based on the connector; and program code of a transmission step, wherein, if the determination step determines the rasterization level to be a first rasterization level, the transmission step includes converting the print instruction received in the reception step into image data and transmitting the image data to the printer, and, if the determination step determines the rasterization level to be a second rasterization level, the transmission step includes converting the print instruction received in the reception step into print data, to be converted into image data by the printer, and transmitting the print data to the printer.

23. A program product according to claim 22, wherein the determination step determines the rasterization level based on a type of the connector.

24. A program product according to claim 22, wherein the connector functions at a data transmission speed and the determination step determines the rasterization level based on the data transmission speed of the connector.

25. A program product according to claim 22, wherein the connector operates within a band width and the determination step determines the rasterization level based on the band width of the connector.

26. A program product according to claim 22, wherein the determination step determines the rasterization level based on the connector and the printer.

27. A program product according to claim 22, wherein the determination step determines the rasterization level based on a table.

28. A program product according to claim 22, wherein, if the determination step determines the rasterization level to be a third rasterization level, the transmission step includes converting the print instruction received in the reception step into image data and print data, to be converted into image data by the printer, and transmitting the image data and the print data to the printer.

* * * * *

UNITED STATES PATENT AND TRADEMARK OFFICE
CERTIFICATE OF CORRECTION

PATENT NO. : 6,249,835 B1
DATED : June 19, 2001
INVENTOR(S) : Takashi Isoda

It is certified that error appears in the above-identified patent and that said Letters Patent is hereby corrected as shown below:

Column 3,
Line 12, "cross sectional" should read -- cross-sectional --.

Column 11,
Lines 9 and 13, "too" should be deleted.

Column 12,
Line 39, "cross sectional" should read -- cross-sectional --.

Column 13,
Line 36, "know" should read -- known --.

Column 14,
Line 28, "servers" should read -- serves --.

Column 15,
Line 22, "cross sectional" should read -- cross-sectional -- and "FIG. 23" should read -- ¶ FIG. 23 --.
Line 50, "a" should be deleted.

Signed and Sealed this

Twenty-sixth Day of February, 2002

*Attest:*

*Attesting Officer*

JAMES E. ROGAN
*Director of the United States Patent and Trademark Office*